US008169493B2

(12) United States Patent
Gocho

(10) Patent No.: US 8,169,493 B2
(45) Date of Patent: May 1, 2012

(54) IMAGE ACQUISITION SYSTEM AND METHOD OF AUTHENTICATING IMAGE ACQUISITION DEVICE IN THE IMAGE ACQUISITION SYSTEM

(75) Inventor: Nagahiro Gocho, Hachioji (JP)

(73) Assignee: Olympus Corporation, Tokyo (JP)

( * ) Notice: Subject to any disclaimer, the term of this patent is extended or adjusted under 35 U.S.C. 154(b) by 286 days.

(21) Appl. No.: 12/429,356

(22) Filed: Apr. 24, 2009

(65) Prior Publication Data

US 2009/0207270 A1  Aug. 20, 2009

Related U.S. Application Data

(63) Continuation of application No. PCT/JP2007/070658, filed on Oct. 23, 2007.

(30) Foreign Application Priority Data

Oct. 27, 2006 (JP) .................................. 2006-292828

(51) Int. Cl.
*H04N 5/232* (2006.01)
(52) U.S. Cl. ............ 348/211.99; 348/207.99; 348/211.1; 348/211.8; 455/151.1; 455/352; 340/5.2; 345/158
(58) Field of Classification Search .............. 348/207.1, 348/207.11, 207.99, 211.1, 211.4, 211.8, 348/211.9, 211.99, 734, 222.1; 726/19, 27–28; 455/150.1, 151.1, 151.2, 352, 556.1; 340/5.2, 340/62.5, 63, 5.62, 5.63; 345/158, 169
See application file for complete search history.

(56) References Cited

U.S. PATENT DOCUMENTS 5,323,203 A * 6/1994 Maruyama et al. ............. 396/57
7,301,562 B2 * 11/2007 Belz et al. ................ 348/207.99
7,382,405 B2 * 6/2008 Kusaka et al. ............. 348/231.6
(Continued)

FOREIGN PATENT DOCUMENTS

EP  1 003 069 A2  5/2000
(Continued)

OTHER PUBLICATIONS

International Preliminary Report on Patentability and Written Opinion of the International Searching Authority dated May 7, 2009 (5 pages), issued in counterpart International application No. PCT/JP2007/070658.

(Continued)

*Primary Examiner* — Tuan Ho
*Assistant Examiner* — Kent Wang
(74) *Attorney, Agent, or Firm* — Holtz, Holtz, Goodman & Chick, PC

(57) ABSTRACT

An image acquisition system includes an image acquisition device and a commanding device configured as a separate member from the image acquisition device to transmit an image acquisition execution command to the image acquisition device and thereby to cause the image acquisition device to perform an image acquisition operation. The commanding device includes an authentication information transmission unit configured to transmit authentication information to the image acquisition device to cause the image acquisition device to authenticate the commanding device. The image acquisition device includes an authentication information receiving unit configured to receive the authentication information transmitted from the commanding device, an authentication information recognition unit configured to recognize the authentication information received by the authentication information receiving unit, and a function limiting unit configured to limit a predetermined function of the image acquisition device based on the authentication information recognized by the authentication information recognition unit.

10 Claims, 30 Drawing Sheets

U.S. PATENT DOCUMENTS

| | | | |
|---|---|---|---|
| 7,463,304 B2 * | 12/2008 | Murray | 348/371 |
| 7,619,657 B2 * | 11/2009 | Watanabe et al. | 348/211.2 |
| 2002/0138749 A1 * | 9/2002 | Koguchi et al. | 713/191 |
| 2005/0001024 A1 | 1/2005 | Kusaka et al. | |
| 2006/0028558 A1 * | 2/2006 | Sato et al. | 348/211.99 |
| 2006/0282682 A1 * | 12/2006 | Masaki et al. | 713/186 |
| 2007/0070206 A1 * | 3/2007 | Clark | 348/207.99 |
| 2007/0142068 A1 * | 6/2007 | Matsuo | 455/515 |
| 2008/0049110 A1 * | 2/2008 | Arbouzov | 348/211.99 |

FOREIGN PATENT DOCUMENTS

| | | | |
|---|---|---|---|
| JP | 2000-115624 A | | 4/2000 |
| JP | 2005-42398 A | | 2/2005 |
| JP | 3741713 B2 | | 2/2006 |
| JP | 2006-157686 A | | 6/2006 |
| JP | 2006-180140 | * | 7/2006 |
| JP | 2006-180140 A | | 7/2006 |

OTHER PUBLICATIONS

Japanese Office Action dated Oct. 25, 2011 (and English translation thereof) in counterpart Japanese Application No. 2006-292828.

* cited by examiner

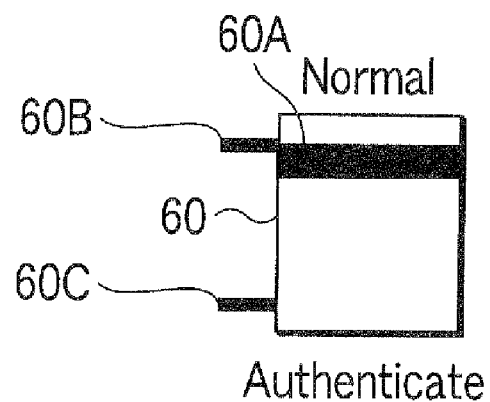
F I G. 4A
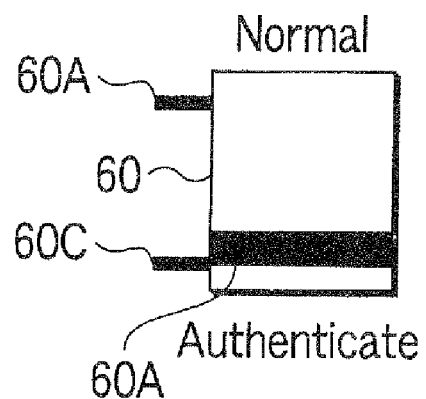
F I G. 4B

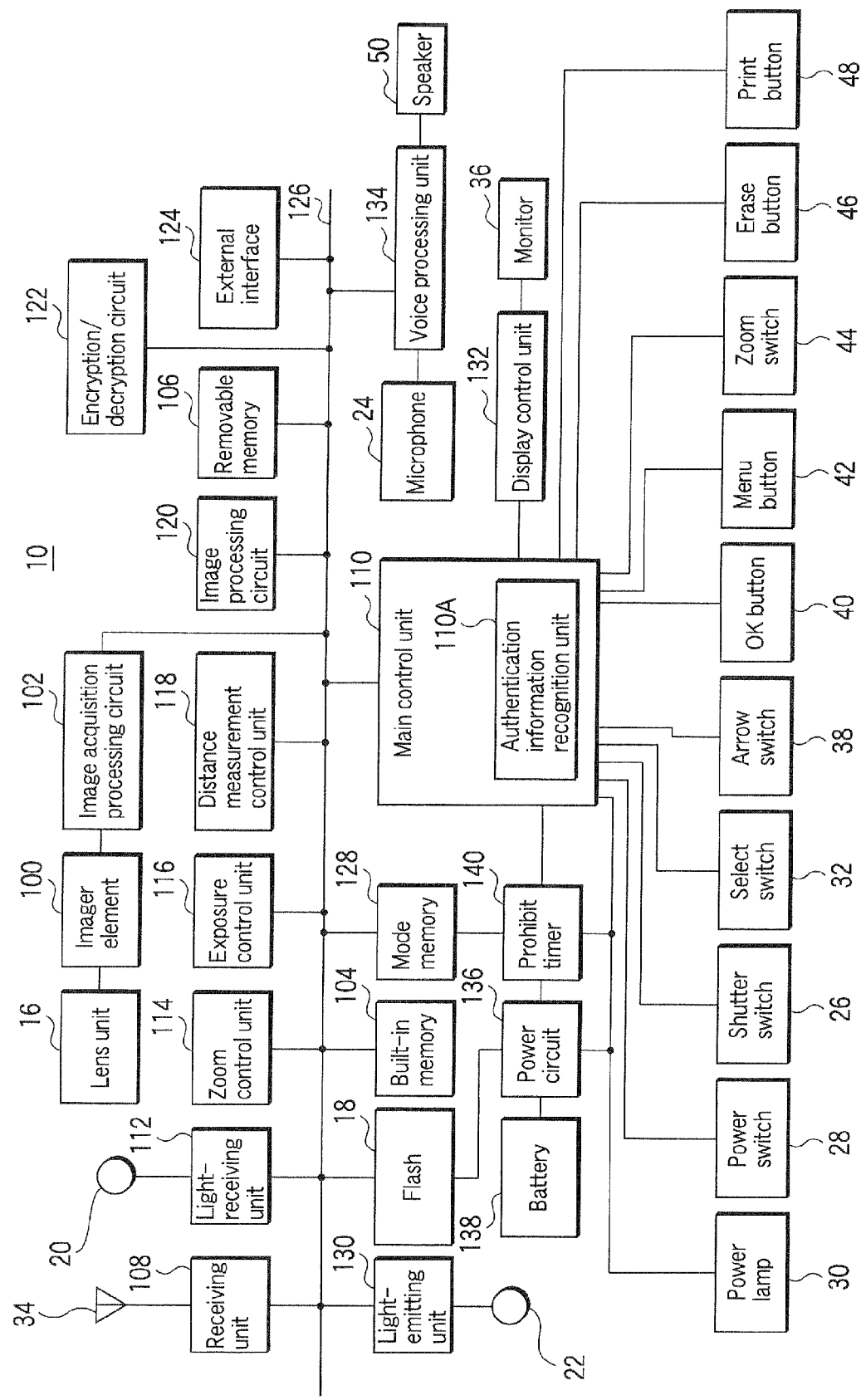
F I G. 7

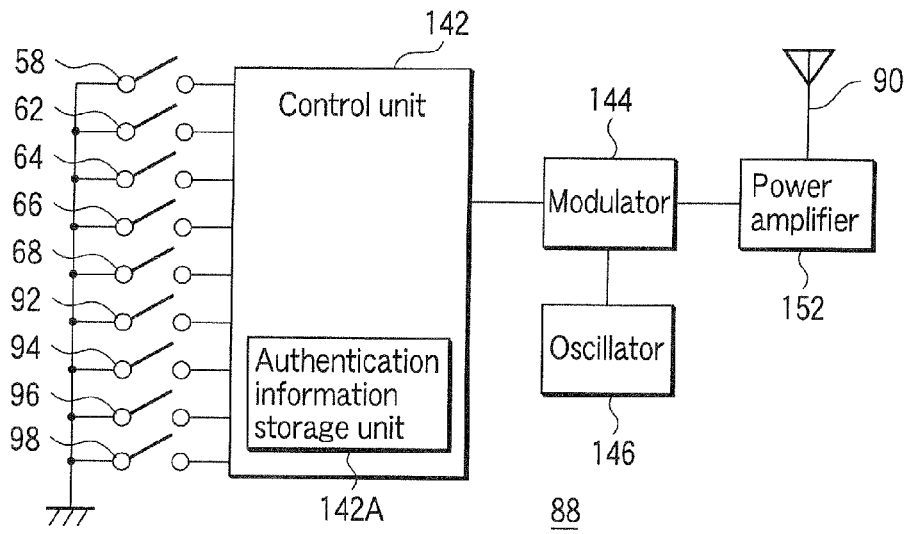
F I G. 10
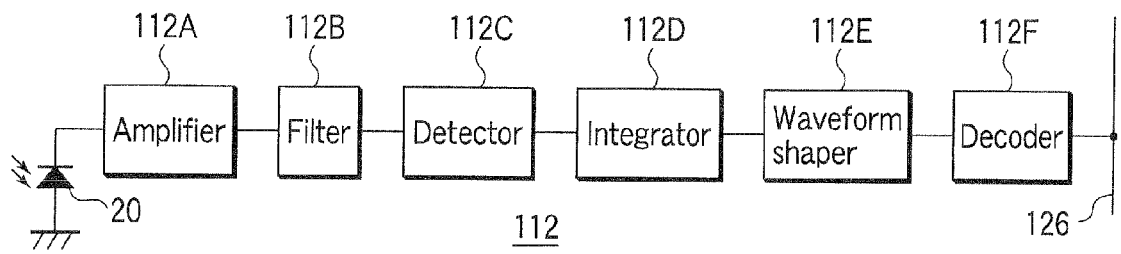
F I G. 11
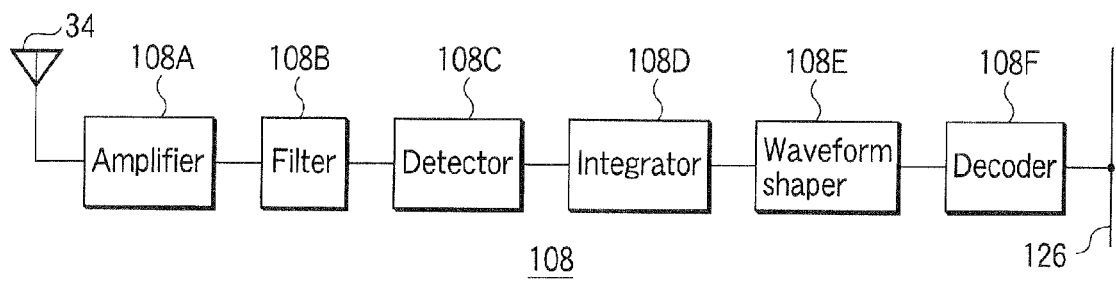
F I G. 12

| Authentication mode | State of camera proper | Application |
|---|---|---|
| Prohibit mode | Unusable by other than remote controller | Safety assured when carried and not used, when stored (held separately from remote controller) or when out |
| Limit mode | Limit use of function | When lent |
| Setting mode | Set/change limit function | |
| Permit mode | Normally usable | When lent or used by owner in low-risk situation |

F I G. 20

| Power on | Setting |
|---|---|
| Prohibit mode | Forcibly set to prohibit mode regardless of mode memory |
| Mode memory storage mode | Set to mode stored in mode memory |

F I G. 21

| Function | | Limit flag | Purpose of limitation |
|---|---|---|---|
| Image acquisition | | 1: Possible, 0: Impossible | Image hiding, privacy protection |
| Play | | 1: Possible, 0: Impossible | In case of only image visible (album, etc.) |
| | Erase | 1: Possible, 0: Impossible | Image protection (willfully or negligently) |
| | Transfer | 1: Possible, 0: Impossible | Image distribution or theft prevention |
| | Print | 1: Possible, 0: Impossible | Image distribution or theft prevention |
| | Edit | 1: Possible, 0: Impossible | Image alteration prevention |
| Menu | | 1: Possible, 0: Impossible | Optimum condition change prevention |

F I G. 22

| Switch, button | Corresponding operation |
|---|---|
| Power switch | Initialize by turning on; end operation by turning off |
| Select switch | Change operation when switching |
| Shutter switch | Switch operation flag set |
| Menu button | Start, set, change and end menu |
| Zoom switch T, W | T, W switch operation flag set, operation command |
| Arrow switch/left, right, up, down | Each switch operation flag set |
| OK button | Switch operation flag set |
| Erase button | Display erase check menu, corresponding operation |
| Print button | Display print menu, corresponding operation |

F I G. 23

| Button | Corresponding operation |
|---|---|
| Remote controller image acquisition command button | Shutter operation, OK button function |
| Remote controller wide-angle button, telephoto button | Wide-angle button, telephoto button operation flag set, operation command |
| Remote controller (+) button, (−) button | Each switch operation flag set |
| Remote controller arrow switch/left, right, up, down | Each switch operation flag set |
| Remote controller OK button | Switch operation flag set |
| Remote controller information button | Information button operation flag set |
| Remote controller print button | Display print menu, corresponding operation |
| Remote controller menu button | Start, set, change and end menu |
| Remote controller erase button | Display erase check menu, corresponding operation |
| Remote controller protection button | Protection button operation flag set |
| Remote controller rotation button | Rotation button operation flag set |
| Remote controller limit button | Switch to limit mode |
| Remote controller prohibit button | Switch to prohibit mode |
| Remote controller setting button | Switch to setting mode |
| Remote controller permit button | Switch to permit mode |

F I G. 24

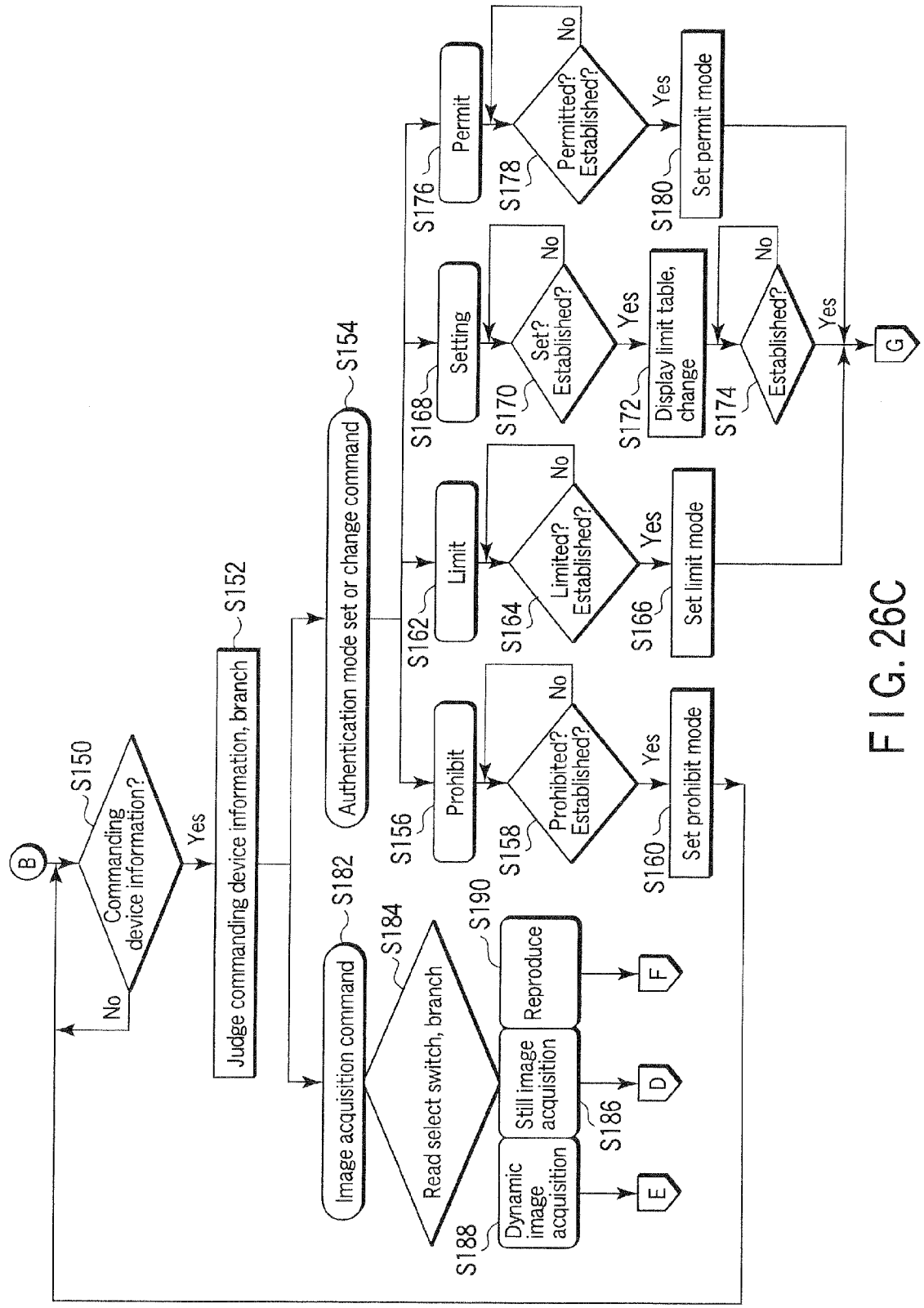
F I G. 26C

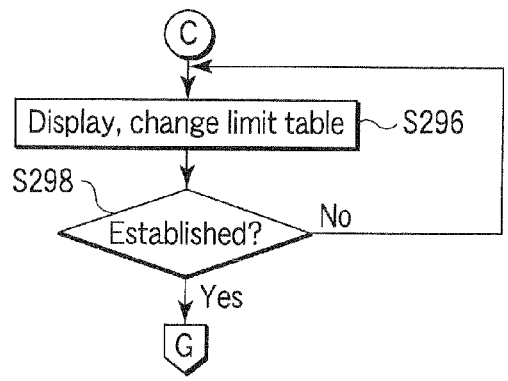
F I G. 26F
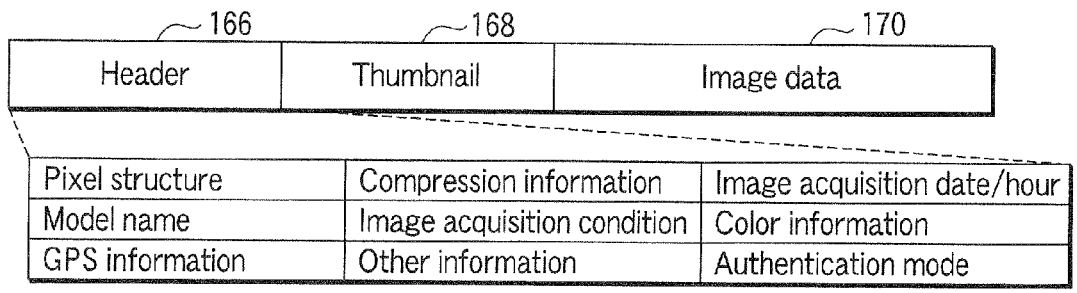
F I G. 27
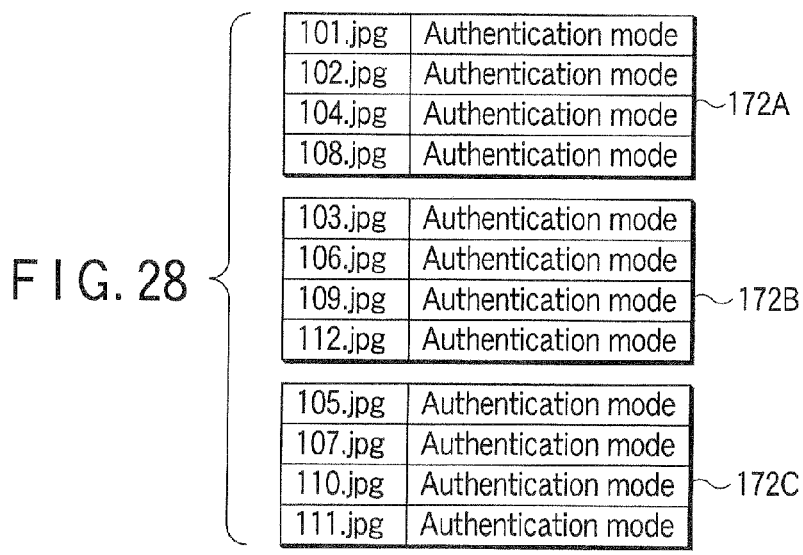
F I G. 28

| | |
|---|---|
| 101.jpg | Authentication mode |
| 102.jpg | Authentication mode |
| 103.jpg | Authentication mode |
| 104.jpg | Authentication mode |
| 105.jpg | Authentication mode |
| 106.jpg | Authentication mode |
| 107.jpg | Authentication mode |
| 108.jpg | Authentication mode |
| 109.jpg | Authentication mode |
| 110.jpg | Authentication mode |
| 111.jpg | Authentication mode |
| 112.jpg | Authentication mode |

174 brackets rows 104.jpg–106.jpg

FIG. 29

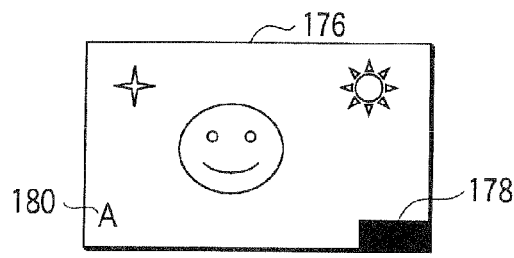

FIG. 30A

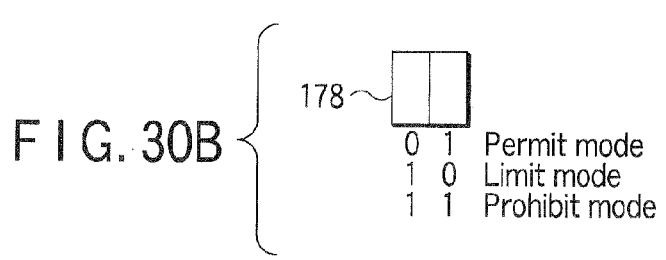

FIG. 30B 178
0 1  Permit mode
1 0  Limit mode
1 1  Prohibit mode

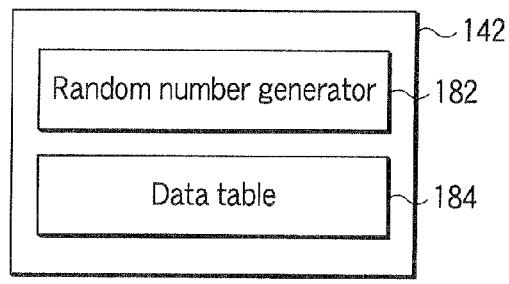
F I G. 31
F I G. 32
F I G. 33A
F I G. 33B

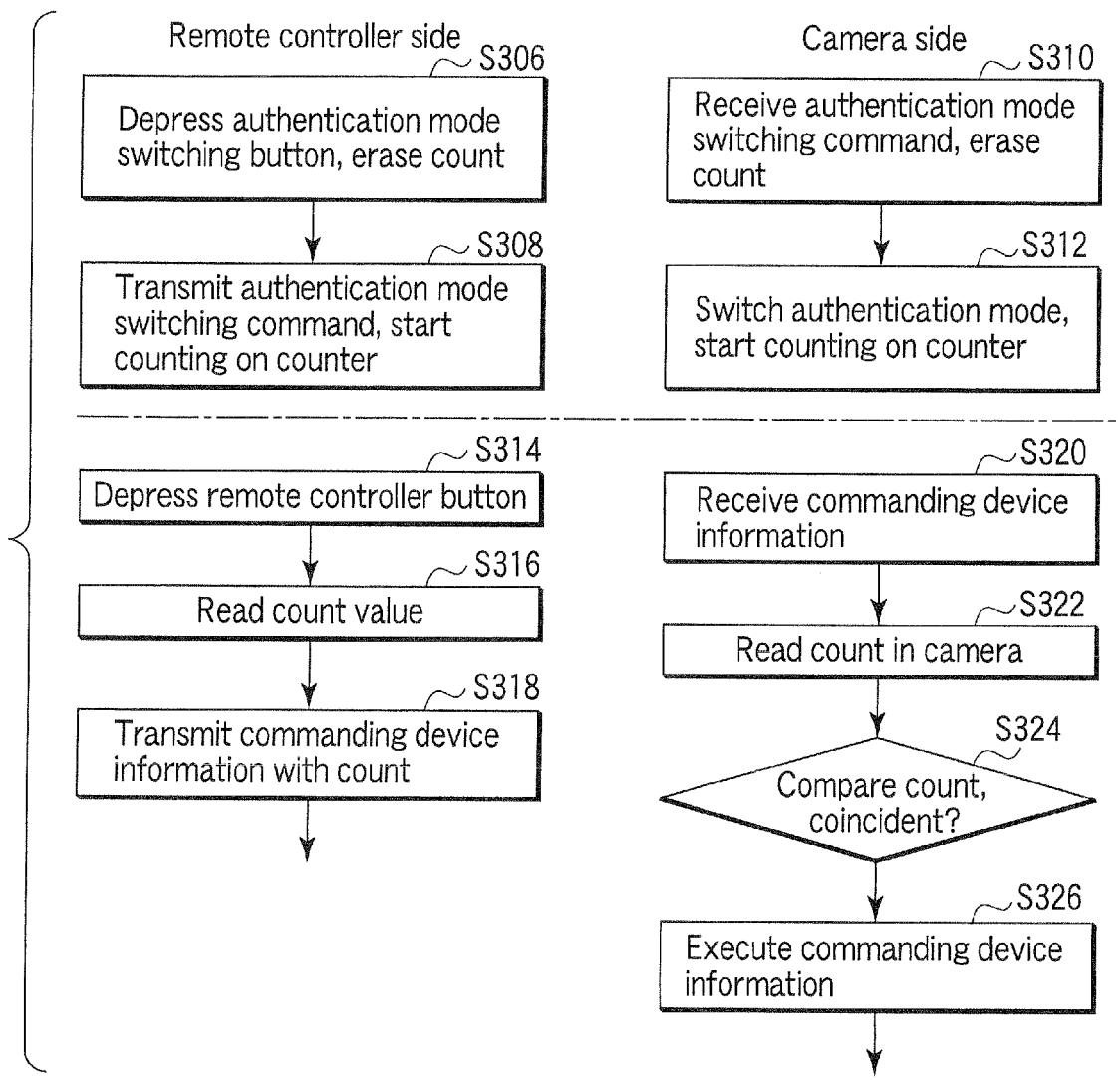
F I G. 37

IMAGE ACQUISITION SYSTEM AND METHOD OF AUTHENTICATING IMAGE ACQUISITION DEVICE IN THE IMAGE ACQUISITION SYSTEM

CROSS REFERENCE TO RELATED APPLICATIONS

This is a Continuation Application of PCT Application No. PCT/JP2007/070658, filed Oct. 23, 2007, which was published under PCT Article 21(2) in Japanese.

This application is based upon and claims the benefit of priority from prior Japanese Patent Application No. 2006-292828, filed Oct. 27, 2006, the entire contents of which are incorporated herein by reference.

BACKGROUND OF THE INVENTION

1. Field of the Invention

The present invention relates to an image acquisition system including an image acquisition device and a commanding device configured as a unit separate from the image acquisition device proper and a method of authenticating the image acquisition device in the image acquisition system.

2. Description of the Related Art

In recent years, concern about the protection of personal information and information security has become so high that, from the viewpoint of protection of personal information and privacy, even an image acquired by oneself must be carefully handled in an increased number of cases depending on the image contents, especially in the case where an image of another person is included.

In a conventional 35-mm film camera, the number of frames is 24 to 36, and should a camera loaded with a film of 36 frames imaged be lost or stolen, at most 36 images lost, this being a relatively small number compared with a digital camera. Depending on the contents, the loss would of course be great and so would be the risk of the information leakage.

With the advent of the age of the digital camera, on the other hand, the acquired images are recorded in the internal memory of the camera as digital information. The images thus recorded can be easily copied on the one hand, and even if they are copied without permission of the owner, the original images remain as they are, and therefore, the owner may not be aware that the images have been copied on the other hand.

Recently, the storage capacity of the storage medium of the digital camera has been so increased that the memory card of even 4 gigabytes is now placed on the market. In the semiconductor market, Moor's Law is known, according to which the design rule is decreased from 90 to 65 mm and further to as small as 45 mm. In the future, the storage capacity of the semiconductor memory continues to be in upward tendency. The capacity of the compact hard disk is also on the increase, and even the hard disk in the size of a Compact Flash (registered trademark) card has reached several gigabytes in capacity. This tendency is expected to continue in the future.

In the case where the storage capacity per frame of image is one megabyte on the average, for example, 2000 frames of images can be recorded in the memory card of 2 gigabytes, and 6000 frames of images in the hard disk of 6 gigabytes. Under the circumstances, an enormous amount of personal information beyond comparison with the storage capacity for the film camera is now carried with each camera.

The image is recorded in the digital camera with the image acquisition date, etc. Some cameras can record even positional information by GPS. In other words, privacy information such as the behavior and the relationships of individual persons are stored in a great amount as images and data. If the camera is lost, a similar camera can be repurchased at several ten to several hundred thousand yen, but the lost images and information may invite the risk of a greater loss.

The image recording format of the digital camera is standardized, and by removing a removable memory card or a card-type hard disk from the camera and inserting it into the memory slot of the card reader or the personal computer (hereinafter sometimes referred to simply as PC), the images and the accompanying information can be easily viewed or copied.

With the increased memory capacity and the decreased price as a background, even a camera with a nonreplicable built-in memory of about 16 megabytes has appeared, with which images can still be recorded even if the removable memory is full or not installed. In view of this situation, a method has been realized to improve the security by increasing the capacity of the built-in memory and preventing the reproduction of the images from the built-in memory without meeting specified conditions, while at the same time making the conventional removable memory compatible with other cameras.

A considerable number of methods have so far been proposed to improve the security by prohibiting the use of the camera by other than the owner and thus preventing the information leakage and the illegal use.

According to EP 1003069 A2, for example, the ID information of the user is registered, and by reading and collating in advance, the use is permitted only in the case where the ID is coincident. Specifically, the function of verifying the retina pattern, the fingerprint or the voiceprint has been proposed. Also, a method has been proposed in which the ID information is input in the memory card in advance and required to be read. In still another method proposed, a keyboard is provided as an ID input unit to input the ID number.

On the other hand, US 2005/0001024 A1 proposes that a first electronic device held by the user and having stored the personal information of the user communicates with a second electronic device by radio, and the second electronic device is customized in accordance with the user by automatically reading the personal information of the particular user.

Further, Jpn. Pat. Appln. KOKAI Publication No. 2005-42398 proposes a car garage shutter system in which the identification data is stored in a remote controller. The use of a private key as the authentication information or the encrypted information has been proposed. The authentication of voice, iris or fingerprints has also been proposed.

To maintain the security of the information, devices and system, on the other hand, an electronic certificate based on a public key and the one-time password utilizing an authentication server and a network also find practical application as a method high in security.

BRIEF SUMMARY OF THE INVENTION

According to a first aspect of the present invention, there is provided an image acquisition system including an image acquisition device having an image acquisition unit and a commanding device configured as a separate member from a main body of the image acquisition device to transmit an image acquisition execution command to the main body of the image acquisition device and thereby to cause the image acquisition unit to perform an image acquisition operation, wherein the commanding device includes:
an authentication information transmission unit configured to transmit authentication information to the image acquisition device to cause the image acquisition device to authenticate the commanding device, and
the image acquisition device includes:
an authentication information receiving unit configured to receive the authentication information transmitted from the authentication information transmission unit of the commanding device;
an authentication information recognition unit configured to recognize the authentication information received by the authentication information receiving unit; and
a function limiting unit configured to limit a predetermined function of the image acquisition device based on the authentication information recognized by the authentication information recognition unit.

According to a second aspect of the present invention, there is provided an image acquisition device authentication method for carrying out authentication between an image acquisition device having an image acquisition unit and a commanding device configured to transmit an image acquisition execution command to the image acquisition device proper thereby to permit the image acquisition unit to perform an image acquisition operation, wherein the commanding device transmits authentication information to the image acquisition device to permit the image acquisition device to authenticate the commanding device, and the image acquisition device receives the authentication information transmitted from the commanding device and, by recognizing the authentication information, limits a predetermined function of the image acquisition device based on the authentication information thus recognized.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4A is an enlarged view of an authentication setting switch at the normal position.

FIG. 4B is an enlarged view of an authentication setting switch at the authentication position.

FIG. 7 is a block diagram showing an electronic configuration of the digital camera shown in FIG. 1.

FIG. 10 is a block diagram showing an electronic configuration of the radio remote controller shown in FIG. 6.

FIG. 11 is a block diagram showing the configuration of a light-receiving unit of the digital camera.

FIG. 12 is a block diagram showing the configuration of a receiving unit of the digital camera.

FIG. 20 is a diagram showing the authentication mode of the camera proper.

FIG. 21 is a diagram for explaining the selection as to the designation of the authentication mode setting at the time of switching on the power of the camera proper.

FIG. 22 is a diagram for explaining the functions available in the limiting mode.

FIG. 23 is a diagram showing the outline of the operation in the case where the switches or the buttons of the camera proper are depressed.

FIG. 24 is a diagram showing the outline of the corresponding operation of the camera proper in the case where the switches or the buttons of the camera proper are depressed.

FIG. 26C is a diagram showing a third part of a series of flowcharts for explaining the process and the status transition in the image acquisition device.

FIG. 26F is a diagram showing a sixth part of a series of flowcharts for explaining the process and the status transition in the image acquisition device.

FIG. 27 is a diagram showing an example of Exif in the case where the authentication mode is added to the acquired image according to a third embodiment of the invention.

FIG. 28 is a diagram showing an example of the album index in the case where the images are held in album form.

FIG. 29 is a diagram for explaining an example of recording the authentication mode as an accessories data of each image file.

FIG. 30A is a diagram showing an example of the case in which the authentication mode information is buried in the image.

FIG. 30B is a diagram for explaining an example of the watermark.

FIG. 31 is a diagram showing the configuration of the control unit of the remote controller according to a fourth embodiment of the invention.

FIG. 32 is a diagram showing an example of the data table.

FIG. 33A is a diagram showing the data format of the transmission data signal from the remote controller in the case where the variable remote controller identification information is added.

FIG. 33B is a diagram showing the data format of the transmission data signal from the remote controller in the case where the variable remote controller identification information is added.

FIG. 37 is a diagram showing the flowchart for explaining the operation of the fifth embodiment.

DETAILED DESCRIPTION OF THE INVENTION

The best mode for carrying out the invention will be explained below with reference to the drawings.

[First Embodiment]

Figure 1:
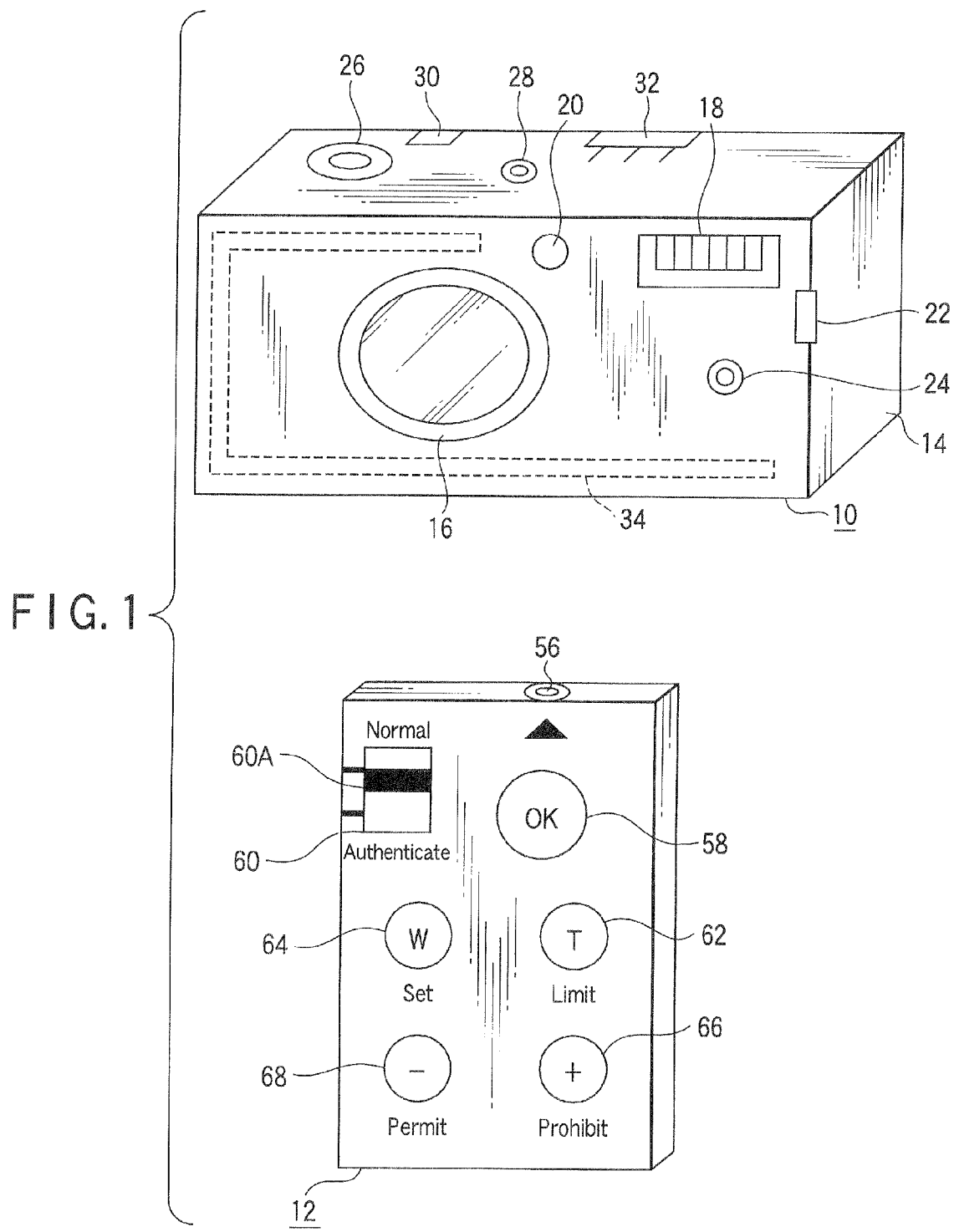
FIG. 1 is a perspective view showing the appearance of the configuration of a digital camera as an example of an image acquisition device and an optical remote controller as an example of a commanding device of an image acquisition system according to a first embodiment of the invention.

The image acquisition system according to the first embodiment of the invention, as shown in FIG. 1, includes an image acquisition device such as a digital camera 10 and a commanding device such as an optical remote controller 12 configured, as a member separate from the image acquisition device, to transmit an image acquisition execution command to the image acquisition device proper thereby to permit the latter to perform the image acquisition operation.

On the front surface of the camera proper 14 of the digital camera 10, there are arranged an image acquisition lens unit 16, a flash 18 for emitting an auxiliary image acquisition light, a photodetector element 20 for receiving the optical signal from a commanding device such as the optical remote controller 12, a light-emitting element 22 for giving an advance notice of the image acquisition operation with the timer or confirming the command from the remote controller, and a microphone 24 used for sound recording during the image acquisition operation or adding a voice message after the image acquisition operation.

Also, a shutter switch 26 is arranged on the upper surface of the camera proper 14. This shutter switch 26, which is a two-stage motion switch in still image acquisition mode, can focus the image by half push and snap the shutter by full push. In dynamic image acquisition mode, on the other hand, the image acquisition operation is started by a first push and stopped by a second push. On the upper surface of the camera proper 14, there are also arranged a power switch 28 for switching on/off the power supply, a power lamp 30 that lights when the power is on, and a three-way slide switch 32 for selecting the still image acquisition mode, the dynamic image acquisition mode and the image play mode.

An antenna 34 for receiving the signal from, for example, a radio remote controller (not shown in FIG. 1) as a commanding device is arranged in the camera proper 14. Incidentally, one of the photodetector element 20 and the antenna 34 is used in accordance with whether the remote controller constituting a commanding device for the digital camera 10 is of the optical type or radio type, respectively. Both of them are of course required, however, in the case where the remote controller is of dual type.

Figure 2:
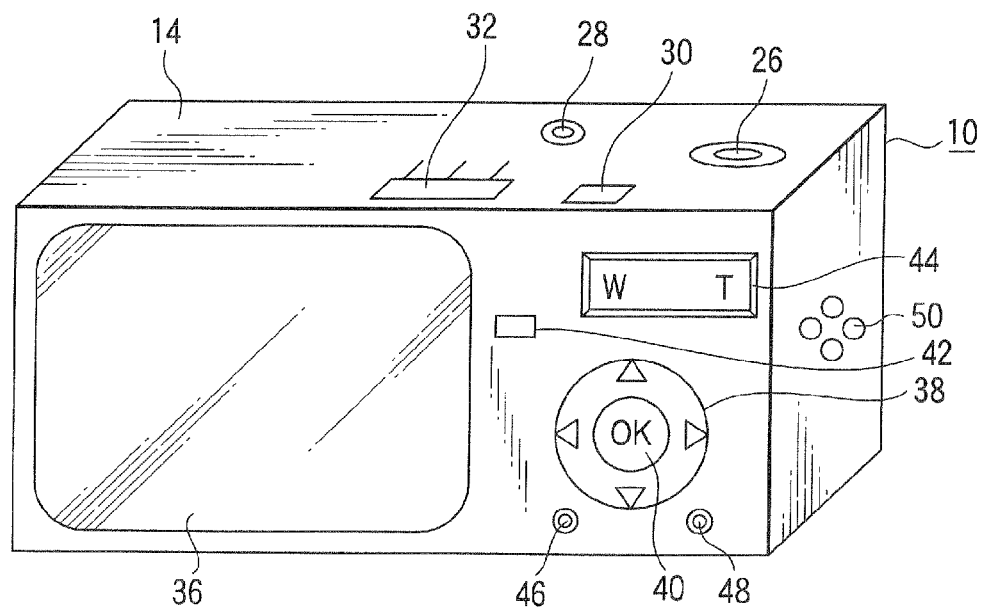
FIG. 2 is a perspective view of the digital camera as taken from the rear side in FIG. 1.

As shown in FIG. 2, on the other hand, the monitor 36 is arranged on the back of the camera proper 14. This monitor 36 is formed of a liquid crystal display unit 1.8 to more than 3 inches in size and having 110 to more than 230 thousand pixels. The fields of application of the monitor 36 include the image confirmation at the time of the image acquisition operation, the image display after the image acquisition operation, the display examples of acquired images for selecting the image acquisition scene, and the display of the setting menu such as the image acquisition conditions, the number of frames of acquired images and the residual capacity of the battery.

Further, an arrow switch 38, an OK button 40, a menu button 42, a zoom switch 44, an erase button 46, a print button 48, etc., are arranged on the back of the camera proper 14. The arrow switch 38 is four-way seesaw switch adapted for depression in four directions, up, down, left and right and used to move the selection items up, down, left or right at the time of selecting a plurality of items displayed on the monitor 36 or to feed the frames of the reproduced images longitudinally. The OK button 40 is a switch to determine the selection items on the monitor 36 at the time of setting conditions, and the menu button 42 is a switch for causing the various menu to be displayed for setting conditions. The zoom switch 44 is a left-right two-way seesaw switch in which the depression of T side moves the zoom lens of the lens unit 16 toward the telephoto side, while the depression of the W side drives the zoom lens to wide-angle side. Also, in play mode, the zoom switch 44 is used also to enlarge or reduce the image or to control the multiscreen display. When the erase button 46 is depressed in play mode, the erase execution confirmation is displayed on the monitor 36, and upon depression of the OK button 40 by selecting the erase by the arrow switch 38, the image being displayed is erased. Also, assuming that the print button 48 is depressed in play mode, the print menu is displayed on the monitor 36, and as long as the digital camera 10 and the printer (not shown) are connected to each other, the image in the digital camera 10 can be printed.

Also, a speaker 50 for producing the alarm sound or the confirmation sound or reproducing the recorded sounds in play mode is arranged on the side surface of the camera proper 14.

Figure 3:
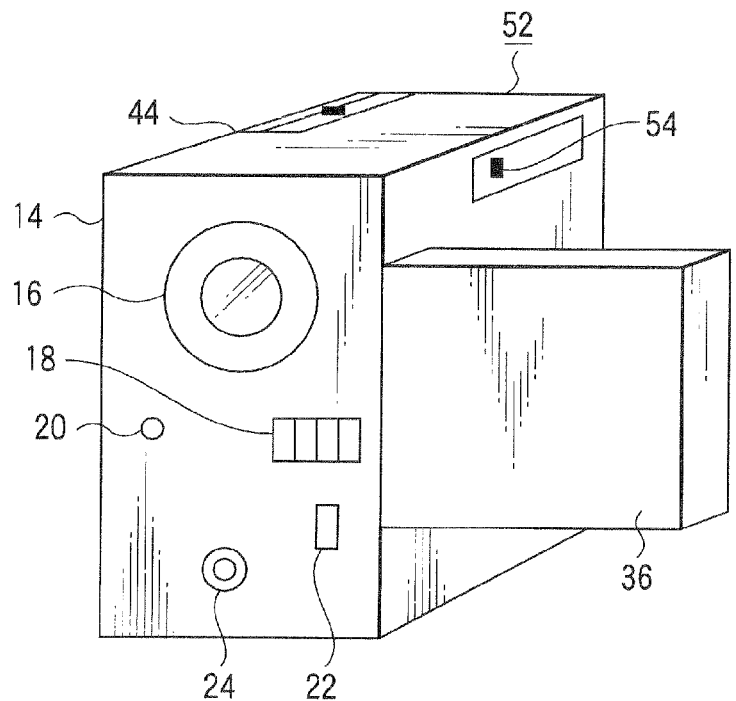
FIG. 3 is a perspective view showing the appearance of the configuration of a digital movie camera as another example of the image acquisition device according to the first embodiment.

The image acquisition device in the image acquisition system according to the first embodiment may be a digital movie camera 52 as shown in FIG. 3. In FIG. 3, the functional members similar to those of the digital camera 10 are designated by the same reference numerals, respectively. Specifically, in this digital movie camera 52, the front surface of the camera proper 14 has arranged thereon a lens unit 16, an auxiliary image acquisition light-emitting flash 18, a photodetector element 20 for receiving the signal light from the commanding device, a light-emitting element 22 for giving an advance notice of the image acquisition operation performed with timer or confirming the command from the commanding device, and a microphone 24 used to record the sound during image acquisition or add a voice message after image acquisition.

Also, the side surface of the camera proper 14 has a monitor 36 rotatably mounted thereon to display the image being acquired or the reproduced image after image acquisition operation. The monitor 36, when out of use, can be closely accommodated in the camera proper 14. Further, the side surface of the camera proper 14 has arranged thereon a power mode switch 54 adapted to turn on/off the power supply or switch the image acquisition mode and the play mode.

A zoom switch 44 is arranged on the upper surface of the camera proper 14. The zoom switch 44 is a left-right two-way seesaw switch in which the depression on T side moves the zoom lens toward telephoto side, while the depression on W side drives the zoom lens to wide-angle side. Also, in play mode, the zoom switch 44 is used also to enlarge or reduce the image or to control the multiscreen display on the monitor 36.

In addition, though not specifically shown, various connectors, menu button and shutter button are arranged on the side and back surfaces of the camera proper 14.

The optical remote controller 12 in the image acquisition system according to the first embodiment has, on the end surface thereof, a light-emitting unit 56 for command transmission, as shown in FIG. 1, as an example of the commanding device. From the light-emitting unit 56, the commanding device information such as an image acquisition command or an authentication mode switching command is transmitted to the digital camera 10 or the digital movie camera 52 making up the image acquisition device.

Also, the upper surface of the optical remote controller 12 has arranged thereon an image command button 58, an authentication setting switch 60, a telephoto button 62, a wide-angle button 64, a plus button 66, a minus button 68, etc. The optical remote controller 12, upon depression of the image acquisition command button 58, transmits an image acquisition execution command to the image acquisition device as an image acquisition command. The authentication setting switch 60 switches between the normal position and the authentication position in accordance with the position of the operating unit 60A thereof, and the functions of other switches 62 to 68 are switched by the position thereof.

The authentication setting switch 60 is a two-position change-over switch. The normal position is assumed when the operating unit 60A is located at the normal position 60B above in FIG. 4A, and the authentication position is assumed when the operating unit 60A is located at the lower authentication position 60C as shown in FIG. 4B.

Specifically, the optical remote controller 12, upon depression of the telephoto button 62 at normal position, transmits to the image acquisition device a T button command as an image acquisition command to drive the lens unit 16 to the telephoto side, and upon depression of the telephoto button 62 at authentication position, transmits to the image acquisition device a limiting command as an authentication mode switching command to switch the image acquisition device to the limiting mode. Similarly, upon depression of the wide-angle button 64 at normal position, the W button command is transmitted as an image acquisition command to drive the lens unit 16 to the wide-angle side, while upon depression of the wide-angle button 64 at authentication position, a setting command is transmitted as an authentication mode switching command to switch the image acquisition device to the setting mode. Also, upon depression of the plus button 66 at normal position, an image acquisition command is transmitted to feed the frame in play mode or move the selection items for menu selection, while upon depression of the plus button 66 at authentication position, a prohibit command is transmitted as an authentication mode switching command to switch the image acquisition device to the prohibit mode. Further, upon depression of the minus button 68 at normal position, an image acquisition command is transmitted to feed the frame or move the selection items for menu selection, while upon depression of the minus button 68 at authentication position, an authentication mode switching command (permit command) is transmitted as an image acquisition command to switch the image acquisition device to permit mode. Incidentally, each mode of the image acquisition device will be described in detail later.

Also, an ordinary remote controller having no authentication function requires no authentication setting switch 60, and as described later, a command can be issued to carry out the functions that the image acquisition device can perform in permit mode or limit mode.

Figure 5:
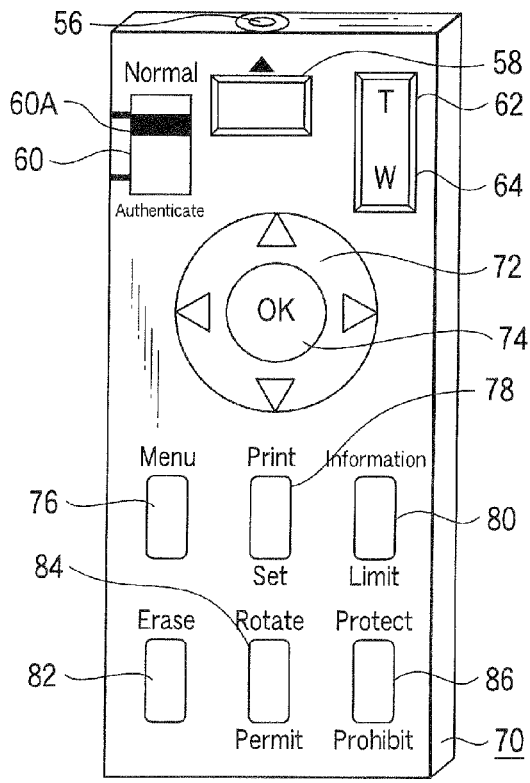
FIG. 5 is a perspective view showing the appearance of the configuration of another optical remote controller as another example of the commanding device according to the first embodiment.

As a commanding device in the image acquisition system according to the first embodiment, the optical remote controller 70 as shown in FIG. 5 may be used. In FIG. 5, the members having similar functions to those of the optical remote controller 12 are designated by the same reference numerals, respectively. Specifically, also in the optical remote controller 70, the light-emitting unit 56 for command transmission is arranged on the end surface thereof, and from this light-emitting unit 56, the image acquisition command or the authentication mode switching command is transmitted to the image acquisition device as the commanding device information. On the upper surface of the optical remote controller 70, on the other hand, there are arranged an image acquisition command button 58, an authentication setting switch 60, a telephoto button 62, a wide-angle button 64, an arrow switch 72, an OK button 74, a menu button 76, a print button 78, an information button 80, an erase button 82, a rotation button 84, a protection button 86, etc.

The optical remote controller 70, upon depression of the image acquisition command button 58, transmits an image acquisition execution command to the image acquisition device as an image acquisition command. Also, upon depression of the telephoto button 62, a T button command is issued, and the image acquisition device that has received it drives the lens unit 16 to the telephoto side during the image acquisition operation, or enlarges the image or controls the multiscreen display in the monitor 36 during the play mode. In similar fashion, upon depression of the wide-angle button 64, a W button command is issued, and in the image acquisition device that has received the W button command, the lens unit 16 is driven to the wide-angle side during the image acquisition operation, while the image is reduced or the multiscreen display is controlled in the monitor 36 during the play mode.

Also, the arrow switch 72 is a four-way seesaw switch adapted to be depressed at any of four points including up, down, left and right, and transmits an operation command corresponding to the direction actually depressed. This switch is used to designate the selection items to the positions up, down, left or right at the time of selecting a plurality of items displayed on the monitor 36 of the image acquisition device or to feed the frames before and after the reproduced image. The OK button 74 is a switch for determining the selection item on the monitor 36 at the time of setting conditions, and upon depression thereof, transmits an OK command. The menu button 76 is a switch for displaying the various condition setting menus on the monitor 36, and upon depression thereof, issues a menu command.

Also, upon depression of the erase button 82, the erase command is transmitted, so that as long as the erase function is not limited in play mode at the time of reception thereof in the image acquisition device, the erase execution confirmation is displayed on the monitor 36. Then, upon depression of the OK button 74 after selecting the erase by the arrow switch 72, the image being displayed is erased.

The authentication setting switch 60, like in FIGS. 4A and 4B, is to switch between the normal position and the authentication position of the operation unit 60A. In accordance with the position of the operation unit 60A, the functions of other buttons 78, 80, 84, 86 are switched.

Specifically, upon depression of the print button 78 at normal position, a print command is issued as an image acquisition command, and in the image acquisition device that has received the print command, the print menu is displayed on the monitor 36, and if the image acquisition device and the printer are connected to each other, the image in the image acquisition device can be printed out. Upon depression of the print button 78 at authentication position, on the other hand, a setting command is issued as an authentication mode switching command, and upon receipt thereof, the image acquisition device switches to the setting mode.

Also, in the case where the information button 80 is depressed at normal position, an information display command is issued as an image acquisition command, and in the image acquisition device that has received it displays the information of the display image on the monitor 36. In the case where the information button 80 is depressed at authentication position, on the other hand, the control command is issued as an authentication mode switching command, and in accordance with the reception thereof, the image acquisition device switches to the limiting mode.

In the case where the rotation button 84 is depressed at normal position, a rotation command is issued as an image acquisition command, and in the image acquisition device that has received it, the display image of the monitor 36 is rotated by 90 degrees. In the case where the rotation button 84 is depressed at authentication position, on the other hand, a permit command is issued as an authentication mode switching command, and in accordance with the reception thereof, the image acquisition device is switched to the permit mode.

Upon depression of the protection button 86 at normal position, a protection command is issued as an image acquisition command, and in the image acquisition device that has received it, the image displayed on the monitor 36 is protected from erasure by attaching a protective flag thereto. Incidentally, this protective flag can be cleared on the menu displayed by the operation of the menu button 76. In the case where the protection button 86 is depressed at authentication position, on the other hand, a prohibit command is issued as an authentication mode switching command, and in accordance with the reception thereof, the image acquisition device is switched to the prohibit mode.

Figure 6:
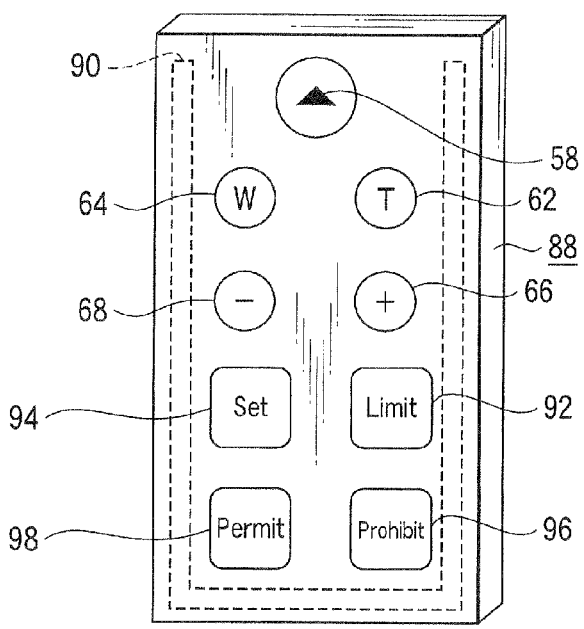
FIG. 6 is a perspective view showing the appearance of the configuration of a radio remote controller as another example of the commanding device according to the first embodiment of the invention.

Also, the commanding device in the image acquisition system according to this first embodiment may be a radio remote controller 88 as shown in FIG. 6. In FIG. 6, the functional members similar to those of the optical remote controller 12 are designated by the same reference numerals, respectively. Specifically, the radio remote controller 88 has a built-in antenna 90 for transmitting a command radio signal, and the commanding device information such as the image acquisition command or the authentication mode switching command is transmitted to the image acquisition device through the antenna 90.

The upper surface of the radio remote controller 88 has arranged thereon an image acquisition command button 58, a telephoto button 62, a wide-angle button 64, a plus button 66, a minus button 68, a limiting button 92, a setting button 94, a prohibit button 96, a permit button 98, etc.

The radio remote controller 88 transmits an image acquisition execution command to the image acquisition device as an image acquisition command when the image acquisition command button 58 is depressed. Also, upon depression of the telephoto button 62, a T button command is issued to the image acquisition device to drive the lens unit 16 to the telephoto side. When the wide-angle button 64 is depressed, on the other hand, a W button command is issued to the image acquisition device to drive the lens unit 16 to the wide-angle side. Upon depression of the plus button 66, a command to feed the frames in play mode or move the selection items at the time of menu selection is issued. Upon depression of the minus button 68, a command to feed the frames in play mode or move the selection items at the time of menu selection is issued.

Also, when the limiting button 92 is depressed, a limit command is issued as an authentication mode switching command, and in accordance with the receipt thereof, the image acquisition device switches to the limiting mode. Also, upon depression of the setting button 94, a setting command is issued as an authentication mode switching command and in accordance with the reception thereof, the image acquisition device switches to the setting mode. Further, upon depression of the prohibit button 96, a prohibit command is issued as an authentication mode switching command, and in accordance with the reception thereof, the image acquisition device switches to the prohibit mode. Furthermore, upon depression of the permit button 98, a permit command is issued as an authentication mode switching command, and in accordance with the reception thereof, the image acquisition device switches to the permit mode.

As described above, in the radio remote controller 88, no authentication setting switch is available, and the normal buttons and the authentication mode switching buttons are independent of each other. The switching of the authentication mode is so important that in order to prevent the operation error by mistaken touch or the like, when any one of the buttons 92 to 98 is depressed at the same time as the image acquisition command button 58, a command for switching to the corresponding mode in authentication mode may be issued.

The remote controllers 12, 70 and 88 described above are each an example of the commanding device, and the invention is not of course limited to the above-mentioned configuration. For example, a radio remote controller having the switches and the buttons of the remote controller 12 or 70 or an optical remote controller having the switches and buttons of the remote controller 88 may be employed. Further, switches and buttons may be added.

Next, the electronic configuration of the digital camera 10 described above will be explained. As shown in FIG. 7, the digital camera 10 includes an imager element 100 for converting the image of an object focused thereon by the lens unit 16 into an electrical signal. The lens unit 16 focuses the image of the object on the imager element 100. The lens unit 16, depending on the type of the image acquisition device, has the shutter function of single-lens reflex camera type or lens shutter type on the one hand, and the zoom function, the auto focus function and the brightness reduction function on the other hand. As the imager element 100, the CCD or CMOS sensor having pixels on the order of one million or more than ten million is used. The image acquisition processing circuit 102 processes the signal from the imager element 100, and by analog-to-digital conversion, records it in the built-in memory 104 or the removable memory 106 in a predetermined format set in the menu or the like. As such a format, the RAW data format with the image not compressed, the JPEG format based on the standard compression scheme, or in the case of dynamic images, the motion JPEG format, the MPEG2 or MPEG4 format is used.

In the receiving unit 108, the signal received through the antenna 34 as a command radio signal from the radio remote controller 88 is amplified, demodulated, and in collaboration with the main control unit 110, decoded and converted into command data. In the light-receiving unit 112, on the other hand, the command light from the optical remote controller 12 or 70 is converted into an electrical signal by the photodetector element 20, amplified, demodulated, and in collaboration with the main control unit 110, decoded and converted into a command data. Only one of the optical remote controller and the radio remote controller may be used with the corresponding one of the receiving unit 108 and the light-receiving unit 112.

In the case where a still image or a dynamic image can be acquired, the zoom control unit 114 drives the lens unit 16 by operating the zoom switch 44 of the camera proper 14 or the telephoto button 62 or the wide-angle button 64 of the remote controller 12, 70 or 88. The exposure control unit 116, in accordance with the image acquisition conditions set in the digital camera 10, controls the diaphragm or the imager element 100 in accordance with the brightness of the object. The distance measurement control unit 118 controls the operation of driving the lens unit 16 and the detection of the focal point using the signal from the imager element 100.

The image processing circuit 120, in collaboration with the program and the CPU of the main control unit 110, executes such processes as the enlargement/reduction, compression/expansion, distortion correction, color correction, noise removal, synthesis and rotation of the image. The removable memory 106 for recording the image is configured of a semiconductor memory card and a hard disk drive, and can be mounted on or demounted from the connector (not shown) of the camera proper 14. This removable memory 106 has the capacity of several tens of megabytes to several gigabytes to record the image and the attribute information thereof. The encryption/decryption circuit 122 is used to encrypt the image recorded and to decrypt the encrypted image in the removable memory 106. This process can be omitted, however, and can alternatively be executed according to a program by the CPU of the main control unit 110. The external interface 124 includes the signal conversion function and the connector for connecting the digital camera 10 to the printer or the personal computer, the external storage device such as the hard disk or the TV receiver (hereinafter referred to simply as TV). The connection with the printer can use the Picto-Bridge, while the personal computer or the external storage device can be connected using USB, and with the TV using the video cable or the like.

The bus 126 is a group of common signal lines connecting the units, and includes the data bus, the address bus and the control bus. The main control unit 110, though not specifically illustrated, is a microcomputer system including CPU, ROM, RAM, register, counter, timer and the rewritable nonvolatile memory to take charge of control, display and the data processing of the digital camera 10 as a whole. This main control unit 110 has an authentication information recognition unit 110A for recognizing the authentication information from the remote controller using the fixed remote controller identification information to identify the remote controller corresponding to the digital camera 10 and recorded in the nonvolatile memory. Specifically, according to the first embodiment, the fixed remote controller identification information is used as the authentication information. Incidentally, the fixed remote controller identification information is recorded preferably before the factory shipment or sales of the digital camera 10. Further, the fixed remote controller identification information is desirably encrypted to prevent illegal use.

The built-in memory 104 is the one that cannot be taken out of the digital camera 10. The built-in memory 104 can record the acquired image selectively designated to be recorded only in the built-in memory 104, the image acquired in prohibit mode, or the image acquired in limit or permit mode with the removable memory 106 full or absent. A suitable built-in memory 104 is a semiconductor memory of several tens of megabytes to several gigabytes or a miniature hard disk of the order of several hundred megabytes to ten gigabytes.

The mode memory 128 is configured of a nonvolatile memory and can store and hold the authentication mode. The stored data is held even when power is off, so that even in the case where the battery is removed and left either willfully or negligently, the set mode such as the prohibit mode is held and maintained at the next time of power on.

The flash 18 emits the flash light in accordance with the flash mode set by the menu at the time of acquiring a still image, such as the mode in which the light is emitted automatically in a dark environment or in rear light, the soft light emission mode in which light is emitted weakly, the red-eye reduction mode in which the light is emitted preliminarily several times before the main light emission, the forced light emission mode in which the light is forcibly emitted or the light emission prohibit mode in which no light is emitted. The light-emitting unit 130 controls the lighting of the light-emitting element 22. The display control unit 132 controls the display of the acquired image, reproduced image, the menu, the information or the alarm characters or symbols on the monitor 36. The voice processing unit 134 processes and records the sound acquired by the microphone 24 during the image acquisition operation, reproduces and supplies the recorded sound to the speaker 50 during the play mode, or supplies the alarm sound or the like to the speaker 50.

In the power circuit 136, the power from the battery 138 or an external power supply (not shown) is converted into a required voltage and supplied to each part. The battery 138 is replaceable and includes a lithium ion rechargeable battery or a dry cell.

The prohibit timer 140 reaches the time-up state upon lapse of a preset time after starting, and then sets the authentication mode of the mode memory 128 to prohibit mode. Even in the state where the power supply of the camera proper 14 is in off state, power continues to be supplied to the prohibit timer 140 in collaboration with the battery 138 and the power circuit 136. The counting operation is thus continued, and upon lapse of the preset time, the time-up state is reached and the authentication mode of the mode memory 128 is set to prohibit mode. In the process, the prohibit mode may be set according to a program after power is supplied to the main control unit 110 and the mode memory 128 for a short time. As an alternative, the mode memory 128 may be set to the prohibit mode by generating the prohibit mode setting address or the prohibit mode data and driving the control bus for a short time in such a manner that the prohibit mode of the mode memory 128 can be set by the prohibit timer 140 without the intermediary of the main control unit 110. Also, the power circuit 136 may be assigned the voltage monitor function to set the prohibit mode before the voltage reaches an insufficient level for the circuit operation. In the case where the battery 138 is pulled off, the prohibit mode may be forcibly set upon lapse of a preset time taking the presence or absence of the backup battery or capacitor into consideration.

By employing this method, the situation can be prevented in which the battery 138 is pulled off willfully or negligently or left consumed up while the backup battery or capacitor is consumed to such an extent that the prohibit timer 140 cannot perform the counting operation with the result that the prohibit mode cannot be set upon lapse of the preset time, thereby making it possible to use the digital camera 10.

The power of the camera proper 14 is switched on/off by the power switch 28, and while the power is on, the power lamp 30 is lighted. The shutter switch 26 and the select switch 32 are similar to those explained with reference to FIGS. 1 and 2. The arrow switch 38, the OK button 40, the menu button 42, the zoom switch 44, the erase button 46 and the print button 48 operate in the same way as explained above with reference to FIG. 3. Each switch and button are connected to the interrupt line of the CPU of the main control unit 110 and/or the input/output port.

The digital movie camera 52 is formed to have the appearance in the shape taking the operability for the protracted dynamic image acquisition operation into consideration. The basic functional configuration, however, is similar to that of the digital camera 10 shown in FIG. 7.

Next, with reference to FIG. 8, the electronic configuration of the optical remote controller 12 will be explained. The control unit 142 reads the state of the authentication setting switch 60 when any of the buttons 58, 62 to 68 is turned on and produces a command signal corresponding to the particular state. Also, the control unit 142 has an authentication information storage unit 142A with a nonvolatile memory for recording the fixed remote controller identification information to identify the remote controller having the authentication function corresponding to the image acquisition device. The fixed remote controller identification information is recorded in the authentication information storage unit 142A desirably before factory shipment or distribution. Further, the fixed remote controller identification information is desirably encrypted to prevent illegal use.

The control unit 142 produces the signal as long as the button is kept depressed for a preset length of time. In the modulator 144, the carrier wave produced by the oscillator 146 is modulated by the signal from the control unit 142 thereby to drive the transistor 148 and blink the light-emitting unit 56. The resistor 150 is for limiting the current. The light-emitting unit 56 is constituted of the infrared light-emitting diode having the wavelength of 900 to 950 nm in many cases. Nevertheless, the light of other wavelength or visible light may be used.

Figure 9:
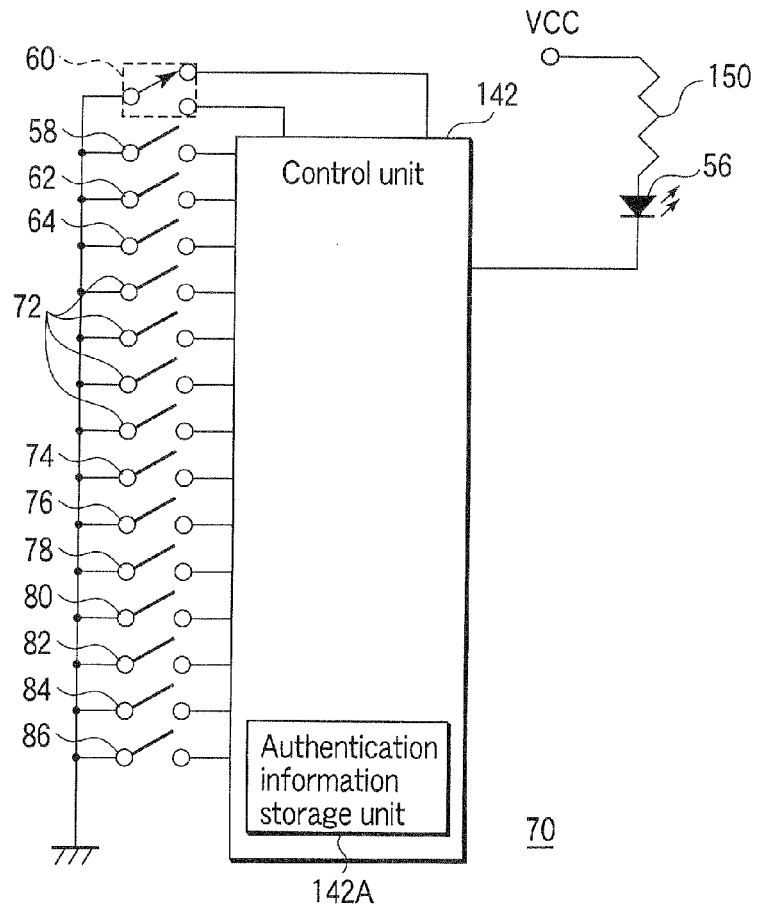
FIG. 9 is a block diagram showing an electronic configuration of the optical remote controller shown in FIG. 5.

Next, with reference to FIG. 9, the electronic configuration of the optical remote controller 70 will be explained. In FIG. 9, the functional members similar to those of the optical remote controller 12 are designated by the same reference numerals, respectively. Specifically, in the optical remote controller 70, the control unit 142 reads the state of the authentication setting switch 60 when any of the buttons and switches 58, 62, 64, 72 to 86 is turned on, and produces a command signal corresponding to the particular state. Also, the control unit 142 has an authentication information storage unit 142A with a nonvolatile memory to record the fixed remote controller identification information for identifying the remote controller having the authentication function corresponding to the image acquisition device. The fixed remote controller identification information is recorded in the authentication information storage unit 142A desirably before factory shipment or distribution. Further, the fixed remote controller identification information is desirably encrypted to prevent illegal use.

The control unit 142 produces the signal as long as a button or switch is kept depressed for a preset length of time. In the case where the carrier frequency is 40 kHz, the use of the control unit 142 formed of a one-chip microcomputer capable of driving the light-emitting diode directly makes it possible to produce the high-frequency modulation signal in accordance with a program in a configuration omitting the modulator 144, the oscillator 146 and the transistor 148. As a result, the light-emitting unit 56 connected to the power supply through the current-limiting resistor 150 is connected directly to the control unit 142.

Next, the electronic configuration of the radio remote controller 88 will be explained with reference to FIG. 10. In FIG. 10, the functional members similar to those of the optical remote controller 12 are designated by the same reference numerals, respectively. Specifically, when any of the buttons and switches 58, 62 to 68, 92 to 98 are turned on, the control unit 142 of this radio remote controller 88 produces the command signal corresponding to the function of the particular button. Also, the control unit 142 has an authentication information storage unit 142A with a nonvolatile memory to record the fixed remote controller identification information. The fixed remote controller identification information is recorded in the authentication information storage unit 142A desirably before factory shipment or distribution. Further, the fixed remote controller identification information is desirably encrypted to prevent illegal use.

The control unit 142 continues to produce the signal as long as the button or switches are kept depressed for a preset length of time. In the modulator 144, the carrier wave produced by the oscillator 146 is modulated by the signal from the control unit 142 and, after being amplified by the power amplifier 152, the radio signal is radiated from the antenna 90.

Next, the configuration of the light-receiving unit 12 in the digital camera 10 will be explained with reference to FIG. 11. The photodetector element 20 converts the light from the optical remote controller 12 or 70 into an electric current. Incidentally, the photodetector element 20 preferably has, on the front surface thereof, an optical filter (not shown) for passing the light conforming with the wavelength involved thereby to remove the effect of the external light disturbance. The current converted by the photodetector element 20 is amplified by the amplifier 112A and, after the band conforming to the carrier frequency is passed by the filter 112B, detected by the detector 112C. Thus, the carrier frequency component is removed by the integrator 112D thereby to reproduce the signal component. The signal component thus reproduced is shaped in the waveform shaper 112E and converted into the commanding device information by the decoder 112F.

Next, the configuration of the receiving unit 108 in the digital camera 10 will be explained with reference to FIG. 12. The antenna 34 converts the radio signal from the radio remote controller 88 into an electric current. The current thus converted by the antenna 34 is amplified by the amplifier 108A, and after the band conforming with the carrier frequency is passed through the filter 108B, detected by the detector 108C, after which the carrier frequency component is removed by the integrator 108D thereby to reproduce the signal component. The signal component thus reproduced is shaped by the waveform shaper 108E and converted into the commanding device information by the decoder 108F.

Next, the signals produced in the optical remote controllers 12 and 70 will be explained with reference to FIGS. 13 to 16.

Figure 13:
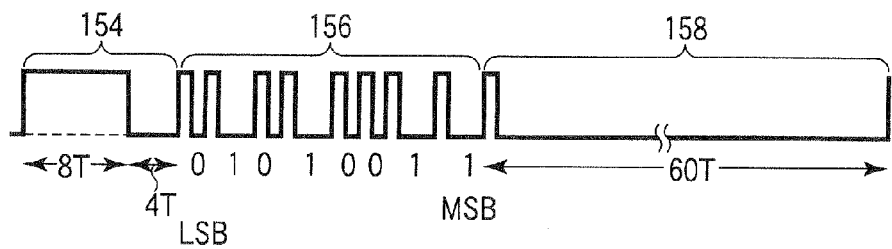
FIG. 13 is a diagram showing the fundamentals of a transmission data signal produced by the optical remote controller.
Figure 14:
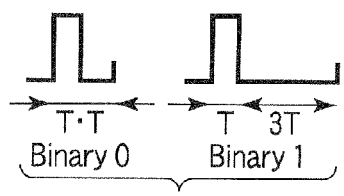
FIG. 14 is a diagram showing the structure of one bit of the data signal.

In transmitting the 1-byte data of 8 bits, the transmission data signal, as shown in FIG. 13, is configured of a leader code 154, an 8-bit data portion 156 and a stop code 158. FIG. 14 is a diagram showing the structure of one bit of the data signal. The binary "0" is expressed by one millisecond (mS) as the sum of the on and off states each equal to the signal unit time T of 500 microseconds (µS), and the binary "1" by 2 mS as the sum of the on state of 1T and the off state of 3T. The data signal shown in FIG. 13 includes the leader code 154 of 6 mS as the sum 12T of the on state of 8T and the off state of 4T, the 8-bit data ("01010011") having four binary 0s of 4 mS and four binary 1s of 8 mS for the total of 12 mS, and the stop code 158 having 60T of 30 mS. Thus, the data signal has a total of 48 mS.

Figure 15:
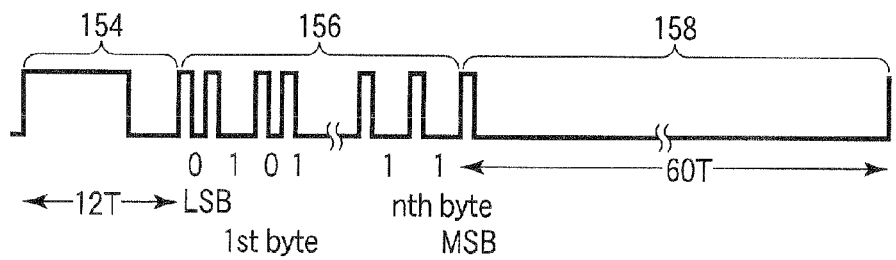
FIG. 15 is a diagram showing a case in which n bytes of data are transmitted.

FIG. 15 is a diagram showing a case in which n bytes of data is sent, in which the leader code 154 is followed by n-byte data portion 156 and then the stop code 158.

Figure 8:
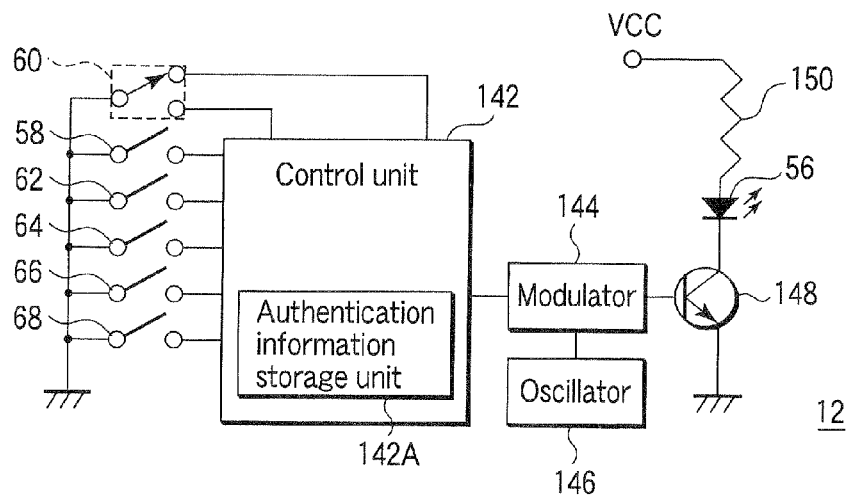
FIG. 8 is a block diagram showing an electronic configuration of the optical remote controller shown in FIG. 1.
Figure 16:
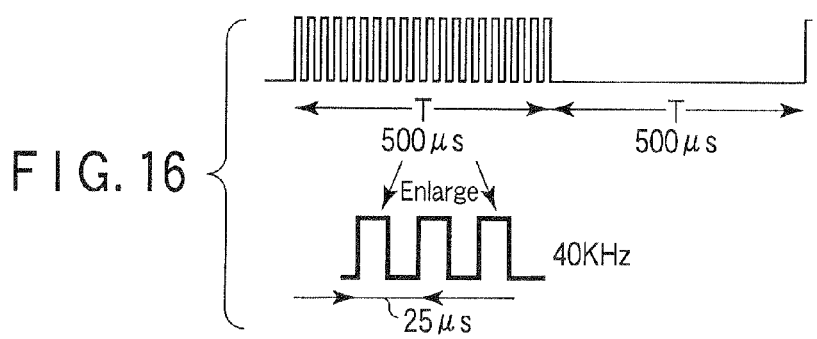
FIG. 16 is a diagram showing the output waveform of a modulation unit of the optical remote controller.

FIG. 16 is a diagram showing the output waveform of the modulator 144 of the optical remote controller 12 shown in FIG. 8. The carrier wave supplied from the oscillator 146 is modulated by the data signal from the control unit 142, and the waveform of binary "0" drives the transistor 148. In the case of the carrier frequency of 40 kHz, 20 carrier wave pulses are inserted in 1T of 500 mS thereby to blink the LED of the light-emitting unit 56.

This is also the case with the optical remote controller 70 shown in FIG. 9.

The light from the light-emitting unit 56 is reproduced by the photodetector 20 shown in FIG. 11 in the form approximate to the modulated waveform substantially as shown in FIG. 16 which carries various forms of noise and the DC component. After removing the noise through the bandpass filter 112B of the carrier frequency 40 kHz, the signal waveform shown in FIG. 15 is reproduced by the detector 112C, the integrator 112D and the waveform shaper 112E, followed by being converted into the data by the decoder 112F.

Figure 17A:
FIG. 17A is a diagram showing an example of the data format of the transmission data signal produced by the optical remote controller in the case where n bytes of data are transmitted.
Figure 17B:
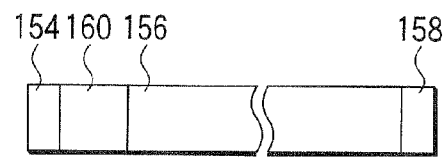
FIG. 17B is a diagram showing an example of the data format of the transmission data signal produced by the optical remote controller in the case where n bytes of data are transmitted.
Figure 17C:
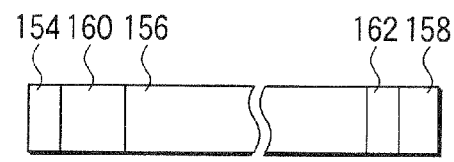
FIG. 17C is a diagram showing an example of the data format of the transmission data signal produced by the optical remote controller in the case where n bytes of data are transmitted.

Next, the data format of the commanding device information of the optical remote controllers 12 and 70 will be explained. In FIG. 17A corresponding to FIG. 15, the n-byte data portion 156 indicating the contents of the commanding device information is basically held between the leader code 154 and the stop code 158, either in fixed or variable length. Also, as shown in FIG. 17B, the m-byte header 160 may be attached before the data portion 156. In this way, the data form or the type of the remote controller may be added in a fixed form. Further, as shown in FIG. 17C, the data for error detection or the P-byte data for error correction (ECC 162) may be added after the data portion 156. As an alternative, the data bit pattern such as used in the commercially available remote controller for the home electronic appliances may be sent in an inverted form immediately following the data to detect the presence or absence of an error by coincidence or incoincidence between the two signals.

Figure 18A:
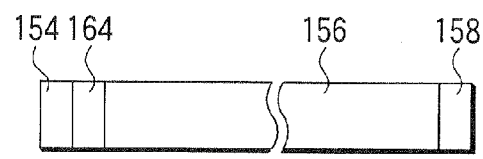
FIG. 18A is a diagram showing an example of the data format of the transmission data signal produced by the optical remote controller in the case where n bytes of data are transmitted.
Figure 18B:
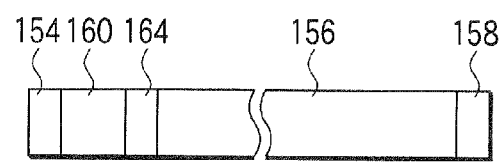
FIG. 18B is a diagram showing an example of the data format of the transmission data signal produced by the optical remote controller in the case where n bytes of data are transmitted.
Figure 18C:
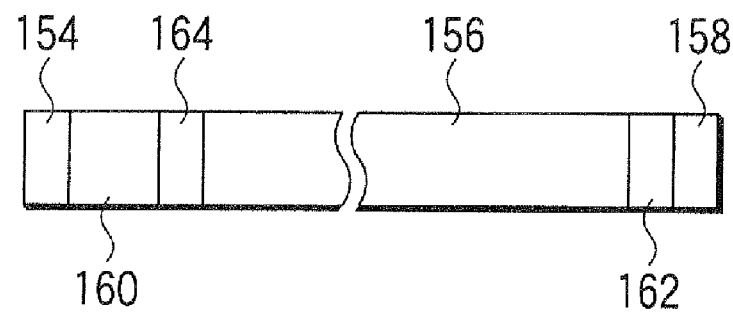
FIG. 18C is a diagram showing an example of the data format of the transmission data signal produced by the optical remote controller in the case where n bytes of data are transmitted.

According to this first embodiment, the fixed remote controller identification information 164 is further transmitted as authentication information. In this case, as shown in FIGS. 18A to 18C, the fixed remote controller identification information 164 may be added and transmitted independently, or may be included as a part of the data portion 156 or the header 160 transmitted (in the latter case, the data format is as shown in FIGS. 17A to 17C).

This fixed remote controller identification information 164 is the same as the fixed remote controller identification information 164 stored in the authentication information recognition unit 110A of the main control unit 110 of the digital camera 10 described in FIG. 7 and used to determine whether the command is transmitted from the right remote controller or not. As explained with reference to FIGS. 8 and 9, the same fixed remote controller identification information 164 is written in the authentication information storage unit 142A of the control unit 142 of the remote controllers 12, 70 paired with the digital camera 10. As a result, in the case where the remote controller 12 or 70 or the digital camera 10, whichever is broken or lost, is repurchased, therefore, the purchaser using the ID certificate or the like, can prove to the maker or the distributor that he/she is a legal owner and the article is not the stolen one, and thus can have the fixed remote controller identification information rewritten.

Figure 19:
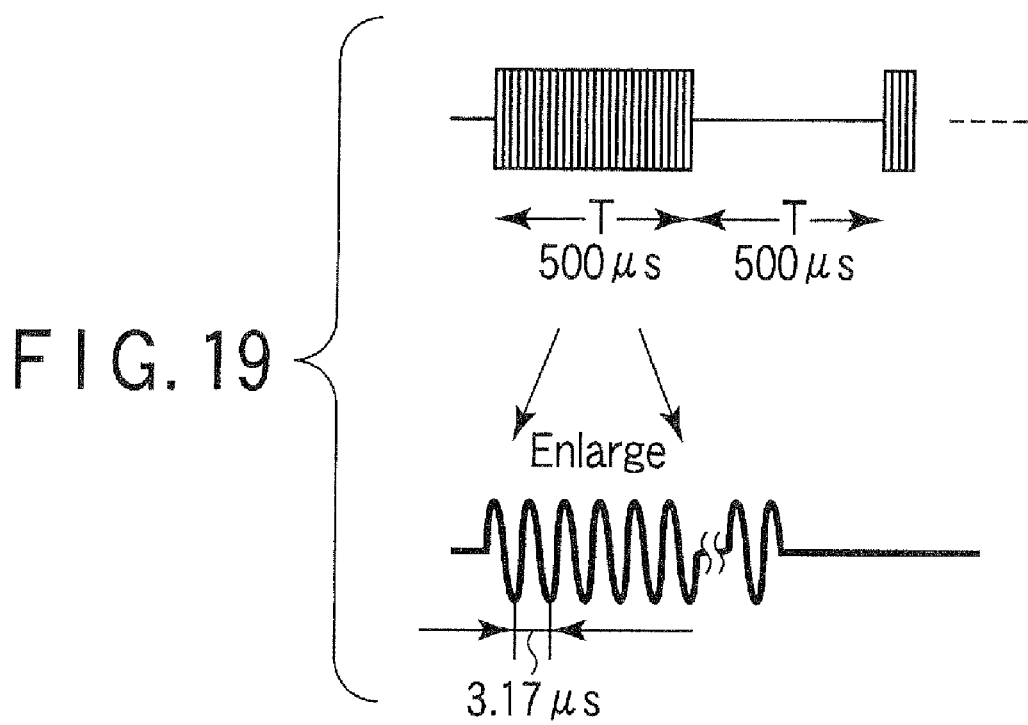
FIG. 19 is a diagram showing the signal produced by the radio remote controller.

Next, the signal produced by the radio remote controller 88 will be explained. The data signal supplied from the control unit 142 to the modulator 144 shown in FIG. 10 is similar to the signals shown in FIGS. 13 to 15. In Japan, the carrier frequency of 315 MHz is used which is lower than 322 MHz above which the restriction of the weak radio signal is stricter and for which a short antenna can be used. This carrier frequency is supplied to the modulator 144 from the oscillator 146 and modulated with the data signal. Then, the signal waveform as shown in FIG. 19 (the waveform of binary "0" is shown) can be obtained. The data signal 1T of 500 μs contains about 157 cycles of the 315-MHz carrier wave having the period of 3.17 μs. A predetermined output is produced from the power amplifier 152 and radiated from the antenna 90.

As explained with reference to FIG. 12, the radio signal received by the antenna 34 is amplified together with noise and other radio signals in the amplifier 108A, and after the noise and the like are removed by the bandpass filter 108B having the carrier frequency of 315 MHz, the signal waveform shown in FIG. 15 is reproduced by the detector 108C, the integrator 108D and the waveform shaper 108E and converted into the data by the decoder 108F.

Next, the authentication mode of the camera proper 14 will be explained. As shown in FIG. 20, the authentication mode includes four types, i.e., "prohibit mode", "limit mode", "setting mode" and "permit mode".

The "prohibit mode" is the mode in which the use by other than the remote controller is prohibited. The camera proper 14 cannot be operated without the signal from the remote controller. Therefore, the remote controller is carried or held separately from the camera proper 14, and the camera proper 14 is set in prohibit mode. Assume that the camera proper 14 is set in prohibit mode in this way. Then, should the camera proper 14 alone be lost and acquired by a third party, the third party cannot use the camera proper 14. The camera proper 14, if lost while the remote controller is held or carried, cannot be used on the one hand, and the leakage of the images in the camera proper 14 is prevented at the same time. Incidentally, even in the prohibit mode, the holder of the remote controller can operate the camera proper 14 using the remote controller.

The "limit mode" is the mode in which only the permitted functions as described later with reference to FIG. 22 can be used. This limit mode is conveniently used in the case where the camera proper 14 is lent temporarily or used by the owner only for image acquisition with the erasure or transfer prohibited.

The "setting mode" is the mode in which the limited function in the limit mode can be set or changed using the remote controller.

The "permit mode" is the mode in which the camera proper 14 can be freely used, i.e., the camera proper 14 is not locked and suitably used by the owner or his/her family members in a limited place such as a home where the risk of being stolen is low or in the case where the camera proper 14 is lent to others with the images therein erased.

Next, the selection for designation and setting of the authentication mode at the time of switching on the power of the camera proper 14 will be explained with reference to FIG. 21. This setting operation can designate either the setting ("prohibit mode") forcing the entrance into prohibit mode regardless of the storage mode of the mode memory 128 using the menu at the time of switching on power, or the setting in the authentication mode ("mode memory storage mode") stored in the mode memory 128 at the time of switching on power. This designation is made in such a manner that the authentication mode setting screen is displayed by menu at the time of switching on power, the plus button 66 and the minus button 68 of the optical remote controller 12 or the radio remote controller 88 or the arrow switch 72 of the optical remote controller 70 is used for selection, and the operation is established by the image acquisition command button 58. The result of this setting can be held in the mode memory 128 or the nonvolatile memory in the main control unit 110.

By making the arrangement to set in "prohibit mode" at the time of switching on power, the camera proper 14 cannot be used alone without issuing a command from the remote controller or without switching to another authentication mode by the remote controller. In other words, the camera proper 14 can be locked. In the case where the arrangement is made to set in "mode memory storage mode" at the time of switching on power, on the other hand, the camera proper 14 enters the mode stored in the mode memory 128. Thus, the camera proper 14 can be used freely if in permit mode, or in accordance with the available function setting if in limit mode. In prohibit or setting mode, the remote controller is required. Once switched to permit or limit mode, however, the prohibit timer 140 starts and upon lapse of a set time, the prohibit mode is entered.

Next, the functions available in limit mode will be explained with reference to FIG. 22. Upon depression of a setting switch of the remote controller (the authentication setting switch 60 and the wide-angle button 64 for the optical remote controller 12; the authentication setting switch 60 and the print button 78 for the optical remote controller 70; and the setting button 94 for the radio remote controller 88), the setting mode is entered. In this setting mode, the functions shown in FIG. 22 and the limiting flag are displayed on the monitor 36, and the item can be selected by the plus button 66 and the minus button 68 of the optical remote controller 12 or the radio remote controller 88, or the arrow switch 72 of the optical remote controller 70, as the case may be. Then, the item can be set by the operation using the image acquisition command button 58 to establish whether the operation is possible or impossible. The result of the setting is held in the mode memory 128 or the nonvolatile memory in the main controller 110 as a function limiting table.

In this case, a still image or a dynamic image can be acquired by the display "image acquisition possible".

In the case of the display "play possible", the image in the built-in memory 104 and the removable memory 106 can be reproduced. Further, the functions available in play mode can be set in detail. Specifically, the erasure is possible in "erase possible", the transfer to the personal computer is possible in "transfer possible", the printing on the printer is possible in "print possible", and the image can be edited in "edit possible".

In "menu possible", the image acquisition conditions, etc., can be changed.

Also, as described above, in the case where the switches or buttons of the camera proper 14 are depressed, the CPU of the main control unit 110 of the camera proper 14 is interrupted or reset and the corresponding operation is performed. FIG. 23 is a diagram showing the outline of this operation. Each corresponding operation will be described in detail later. For the present purpose, the corresponding operation is explained taking the digital camera 10 as an example. Depending on the type of the image acquisition device, the corresponding switch or button may be absent or have a different name.

Assuming that the power switch 28 is depressed with the camera proper 14 in power off state, the power is switched on, and the CPU of the main control unit 110 is reset, thereby starting the operation. In the case where the power switch 28 is depressed with power on, on the other hand, the operation is ended and power supply is switched off.

Once the select switch 32 is turned, the present state is ended and transferred to a new state. Upon depression of the shutter switch 26, the "shutter switch operation flag" is set. This flag is read by the program, and the image acquisition operation starts or ends. Upon depression of the menu button 42, the menu is displayed on the monitor 36, and the setting can be changed by the arrow switch 38 and the OK button 40. Upon another depression of the menu button 42 while the menu is being displayed, the menu operation is ended. Upon depression of the zoom switch 44 on the T or W side, the zoom control unit 114 is driven. Upon depression of any part of the arrow switch 38, the corresponding switch flag is set. Upon depression of the OK button 40, the OK button flag is set. Upon depression of the erase button 46, the erase confirmation menu is displayed on the monitor 36, and upon depression of the corresponding confirmation switch, the erasure is executed. Upon depression of the print button 48, the print menu is displayed on the monitor 36, followed by a predetermined print operation.

The flag set as described above may be cleared either at the time when it is read for an application or after a switch or a button held depressed (during the on state) is turned off.

Next, with reference to FIG. 24, an explanation will be given about the outline of the operation of the camera proper 14 corresponding to the case where a switch or a button of the remote controller is depressed. Depending on the type of remote controller, the corresponding button, etc., may be absent. The camera proper 14, after power is switched on, is kept ready to receive the signal from the remote controller and perform the corresponding operation. Once the signal from the remote controller is caught, the program being executed by interrupt is suspended, and the signal from the remote controller is received, so that as explained with reference to FIGS. 17A to 18C, the receiving data of the data format of the remote controller is stored in a predetermined memory, and the operation is performed in keeping with the intended meaning.

Also, in order to determine whether the remote controller is legitimate or not, the fixed remote controller identification information recorded in the camera proper 14 is compared with the fixed remote controller identification information 164 from the remote controller by the authentication information recognition unit 110A. Further, the fixed remote controller identification information 164 is used to identify the remote controller in the case where the authentication setting switch 60 of the remote controller is set to the authentication position 60C or in the case where the image acquisition device is in prohibit mode and operated in response to only the command from the remote controller.

In the ordinary remote controller without the authentication function, the fixed remote controller identification information is not used, but only the function not limited by the limit mode and the permit mode can be used. It cannot be used in prohibit mode.

In the camera proper 14 that has received the command from the remote controller, the CPU of the main controller 110 performs each operation corresponding to the result of decoding the data received from the remote controller, in the manner described below.

Specifically, upon depression of the image acquisition command button 58 of the remote controllers 12, 70, 88, the image acquisition command flag is set. In the image acquisition mode, this flag is read by the program to perform the operation of starting or ending the image acquisition operation. In setting mode, on the other hand, the select item is established. Upon depression of the telephoto button 62 or the wide-angle button 64 of the remote controllers 12, 70, 88, the zoom control unit 114 is driven. Upon depression of the plus button 66 or the minus button 68 of the remote controllers 12, 88, the corresponding switch flag is set.

Upon depression of any part of the arrow switch 72 of the remote controller 70, the corresponding switch flag is set. Upon depression of the OK button 74 of the remote controller 70, the OK button flag is set. Upon depression of the information button 80 of the remote controller 70, the information of the image being displayed is displayed on the monitor 36, and upon another depression, the display of the particular information is suspended. Upon depression of the print button 78 of the remote controller 70, the print menu is displayed on the monitor 36, followed by performing a predetermined printing operation. Upon depression of the menu button 76 of the remote controller 70, the menu is displayed on the monitor 36, and can be set or changed by the arrow switch 72 and the OK button 74. Upon another depression of the menu button 76 while the menu is being displayed, the menu operation is ended. Upon depression of the erase button 82 of the remote controller 70, the erasure confirmation menu is displayed on the monitor 36. Upon depression of a corresponding confirmation button, the erasure of the image being displayed is executed. Upon depression of the protection button 86 of the remote controller 70, the protection flag is attached to the image displayed on the monitor 36. In the case where an attempt is made to erase this image with the protection flag by the operation of the erase button 82, an alarm to prevent the erroneous erasure is displayed on the monitor 36, so that the erasure is executed by selecting the erasure execution. Upon depression of the protection button 86 while the image with the protection flag is being displayed, the protection flag is cleared. Upon depression of the rotation button 84 of the remote controller 70, the image displayed on the monitor 36 is rotated 90 degrees clockwise, and further depression rotates the image 90 degrees counterclockwise regarding to the original image. Still further depression restores the original image.

Upon depression of the limit button 92 of the remote controller 88, a limit command is issued from the remote controller 88 and the image acquisition device is switched to the limit mode. Upon depression of the prohibit button 96 of the remote controller 88, a prohibit command is issued from the remote controller 88, and the image acquisition device is switched to prohibit mode. Upon depression of a setting button 94 of the remote controller 88, the setting command is issued from the remote controller 88 and the image acquisition device is switched to the setting mode. Upon depression of the permit button 98 of the remote controller 88, a permit command is issued from the remote controller 88 and the image acquisition device is switched to the permit mode.

Figure 25:
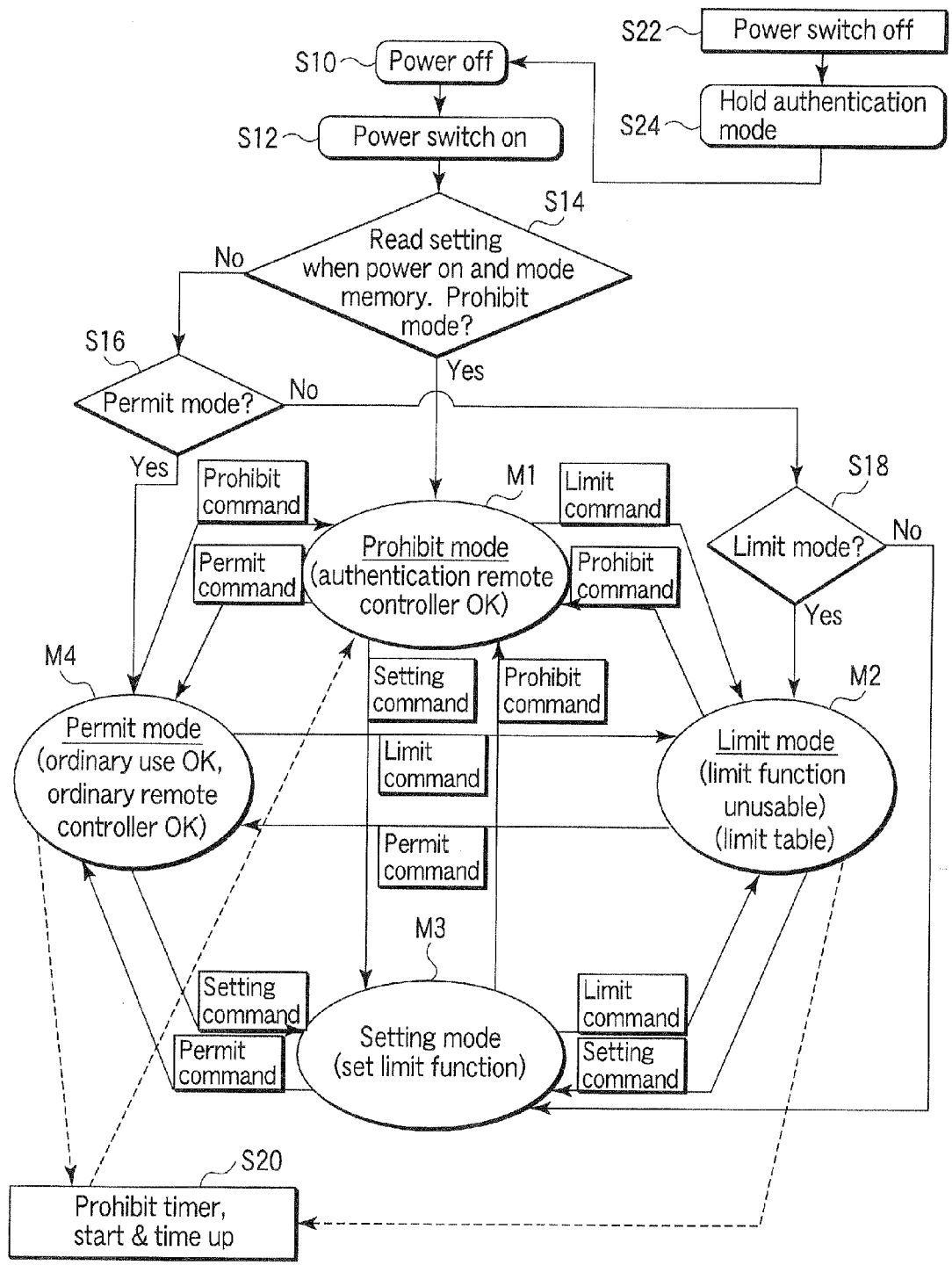
FIG. 25 is a diagram for explaining the transition of the authentication mode.

Next, the transition of the authentication mode will be explained with reference to FIG. 25. In the case where the power switch 28 is turned on (step S12) with the power off (step S10), the authentication mode setting designation and the mode memory storage mode are read at the time of power on as explained in FIG. 21 thereby to determine whether the prohibit mode is in effect or not (step S14). On determining that the prohibit mode is in effect, the prohibit mode M1 is set.

On determining in step S14 that other than the prohibit mode is in effect, on the other hand, determination is made as to whether the permit mode is in effect or not (step S16). On determining that the permit mode is in effect, the permit mode M4 is entered.

On determining in this step (step S16) that the permit mode is not in effect, determination is made whether the limit mode is in effect or not (step S18). On determining that the limit mode is in effect, the limit mode M2 is set. On determining that neither the limit mode is in effect, on the other hand, the setting mode M3 is set.

The transition between the modes can be switched also by the authentication mode switching command with the remote controller identification information from the remote controllers 12, 70, 88, and the transition is made as shown by the prohibit command, the limit command, the permit command and the setting command in the drawing.

Further, in the case where the camera proper 14 is switched to the limit mode M2 or the permit mode M4 in which the camera proper 14 can be used for some purpose, the prohibit timer 140 in the camera proper 14 begins to count from that particular time point (step S20). Upon lapse of a preset time, the camera proper 14 is automatically switched to the prohibit mode M1 and cannot subsequently be used without the remote controller with the remote controller identification information. In order to cancel the prohibit mode M1, the remote controller with the remote controller identification information is required. Even after the power of the camera proper 14 is switched off, the prohibit timer 140 continues to count, and upon lapse of a predetermined time, the prohibit mode M1 is automatically entered. Therefore, the camera proper 14, even if lost in permit mode M4 or limit mode M2, cannot be used upon lapse of the preset time. The set time can be designated on menu by the user, and may be 10 minutes, one hour, one day or one week. By setting the prohibit timer 140 to a short time, the owner can use the camera proper 14 freely in permit mode M4 without taking the trouble of operating the remote controller each time. Also, should the camera be stolen, the fact that the prohibit mode M1 is entered in a short time can secure comparative safety.

In the case where the power switch 28 is depressed again (step S22) and the power is switched off, the authentication mode in effect is held in the mode memory 128 (step S24). Then, the power-off state is obtained (step S10).

Next, the state transition and the process in the image acquisition device will be explained with reference to FIGS. 26A to 26F. Although the case in which the image acquisition device is the digital camera 10 is explained as an example, the digital movie camera 52 can be also handled in similar manner except for the switch operation, etc.

Figure 26A:
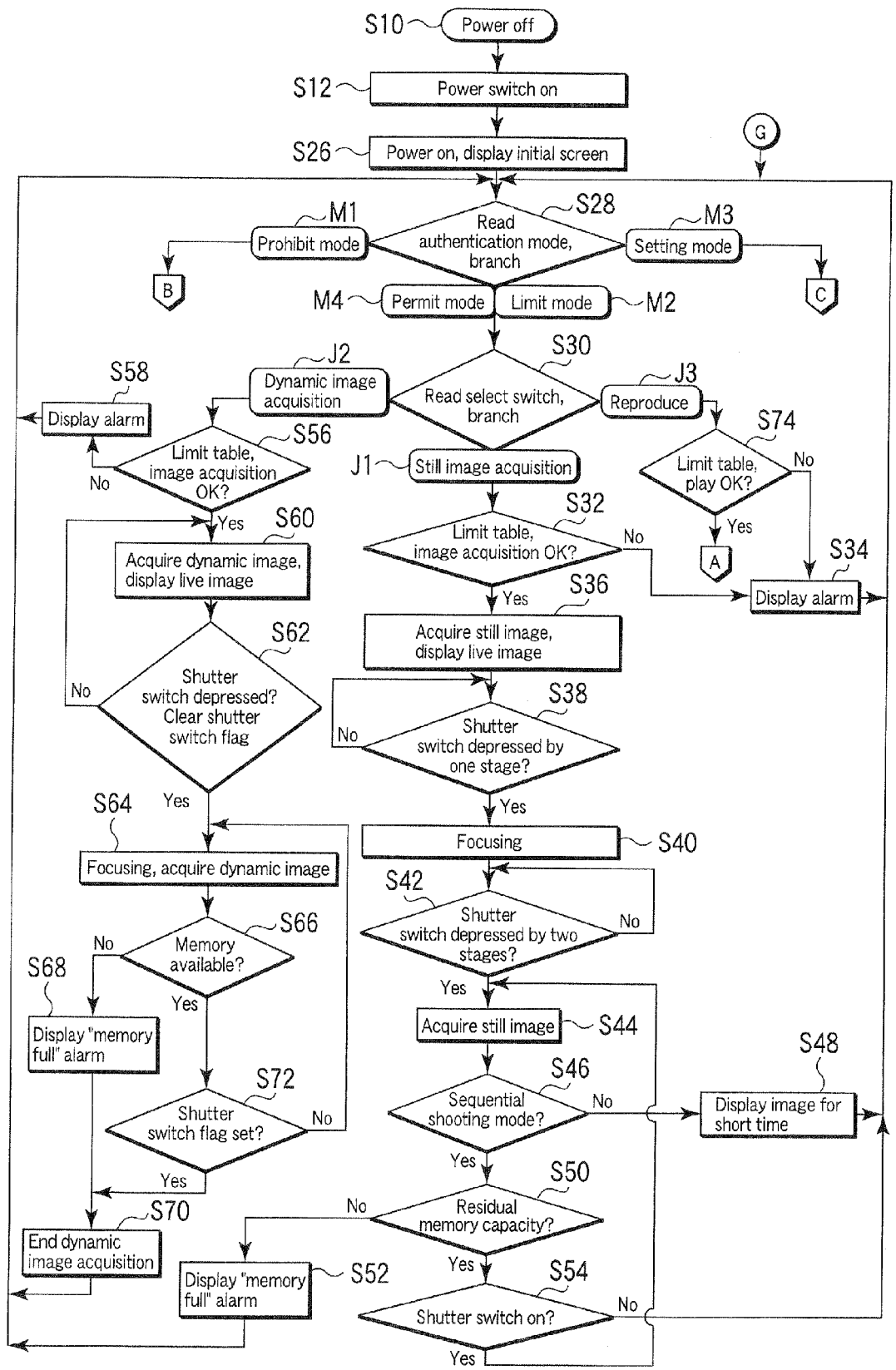
FIG. 26A is a diagram showing a first part of a series of flowcharts for explaining the process and the status transition in the image acquisition device.

First, the image acquisition mode will be mainly explained. Upon depression of the power switch 28 (step S12) with the power off (step S10) as shown in FIG. 26A, the power of the camera proper 14 is switched on, and the initial screen is displayed on the monitor 36 (step S26). A mark, etc., indicating the residual capacity of the battery is displayed on this initial screen. After that, as explained with reference to FIG. 25, the authentication mode setting designation with power on and the storage mode of the mode memory 128 are read, and the operation branches in accordance with the mode (step S28).

On determining that the permit mode M4 or the limit mode M2 is in effect, the state of the select switch 32 is read, and the operation branches to the still image acquisition mode J1, the dynamic image acquisition mode J2 or the play mode J3 (step S30).

In the case where the still image acquisition mode J1 is selected by the select switch 32 in limit mode, the function limit table held in the mode memory 128 or the nonvolatile memory in the main control unit 110 is read to determine whether the image acquisition operation is permitted or not (step S32). On determining that the image acquisition operation is not permitted, an alarm is displayed on the monitor 36 (step S34), and after waiting for a preset time, the process is returned to step S28.

On determining that the image acquisition operation is permitted by the function limit table in limit mode or the permit mode is in effect, on the other hand, the live image is displayed on the monitor 36 while at the same time displaying the current number of the image acquisition pixels consumed and the remaining number of available image frames (step S36). After waiting until the first stage of the shutter switch 26 turns on (step S38), the image is focused (step S40), followed by waiting until the second stage of the shutter switch 26 is reached (step S42). Once the second stage of the shutter switch 26 turns on, the still image is acquired (step S44). After that, whether the sequential shooting mode is set or not is checked (step S46). In the case where the sequential shooting mode is not in effect, the acquired image is displayed on the monitor 36 for a short time (step S48), after which the process returns to step S28.

In the case where the sequential shooting mode is set, on the other hand, checking whether the residual capacity of the built-in memory 104 and/or the removable memory 106 is not less than a predetermined amount (step S50), and in the case where the residual capacity is zero, a "memory full" alarm is displayed on the monitor 36 (step S52), after which the process returns to step S28. In the case where the residual memory capacity is not zero, on the other hand, checking whether the shutter switch 26 is kept on or not (step S54) and in the case where it is off, the process returns to step S28. In the case where the shutter switch 26 is on, on the other hand, the process returns to step S44, and the next still image is acquired.

In the case where the dynamic image acquisition mode J2 is selected by the select switch 32 in step S30 in limit mode, on the other hand, the function limit table held in the mode memory 128 or the nonvolatile memory in the main control unit 110 is read to determine whether the image acquisition operation is permitted or not (step S56). On determining that the image acquisition operation is not permitted, an alarm is displayed on the monitor 36 (step S58) and after waiting until a preset time arrives, the process returns to step S28.

On determining that the image acquisition operation is permitted according to the function limit table in limit mode or in the case where the permit mode is in effect, on the other hand, the live image is displayed on the monitor 36 together with the available image acquisition time with the current number of image acquisition pixels consumed (step S60). By determining whether the shutter switch 26 is turned on or not, by the shutter switch flag which is set upon depression of the shutter switch 26 (step S62), the process returns to step S60 and the live image continues to be displayed if the shutter switch flag is not set.

Once the shutter switch flag is set, the particular shutter switch flag is cleared, after which the focusing operation is performed and the dynamic image begins to be acquired (step S64). While the dynamic image is being acquired, the residual capacity of the built-in memory 104 and/or the removable memory 106 is checked (step S66). In the case where the residual memory capacity is zero, the "memory full" alarm is displayed on the monitor 36 (step S68), after which the dynamic image ceases to be acquired (step S70), and the process returns to step S28. In the case where the residual memory capacity is not still zero, on the other hand, whether the shutter switch flag is set or not is confirmed (step S72), and in the case where it is clear, the process returns to step S64 and the dynamic image continues to be acquired. Once the shutter switch flag is set, the process advances to step S70 to end the dynamic image acquisition, after which the process returns to step S28. In this way, the dynamic image continues to be acquired after the depression of the shutter switch 26 until it is depressed again.

In the case where the play mode J3 is selected by the select switch 32 in step S30 in limit mode, on the other hand, the function limit table held in the mode memory 128 or the nonvolatile memory in the main control unit 110 is read to determine whether the reproduction is permitted or not (step S74). On determining that the reproduction is not permitted, the process proceeds to step S34 to display an alarm on the monitor 36, after which the process returns to step S28 at a preset time.

Figure 26B:
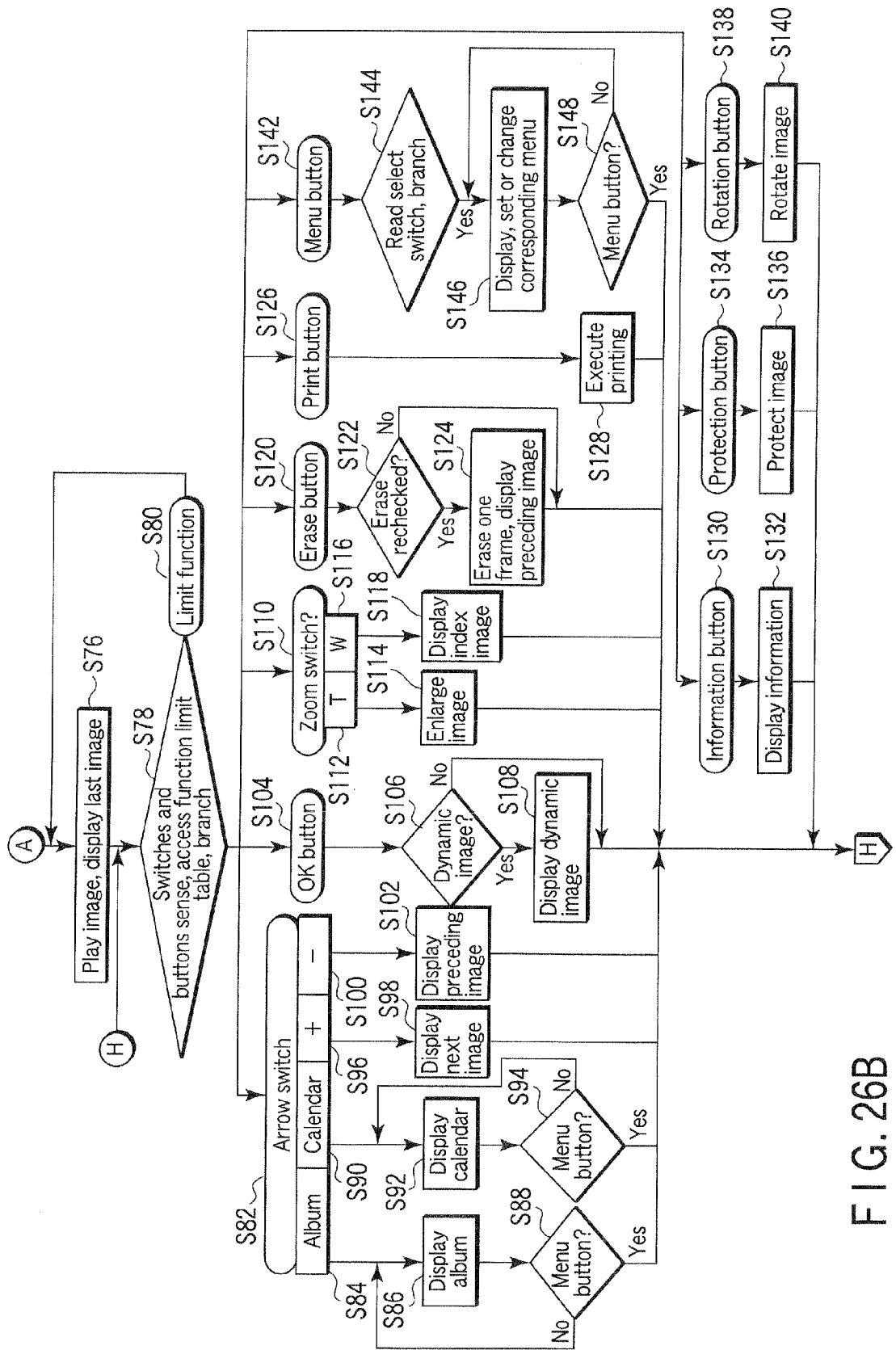
FIG. 26B is a diagram showing a second part of a series of flowcharts for explaining the process and the status transition in the image acquisition device.

In the case where the reproduction is permitted in limit mode or in the case where the permit mode is in effect, the play mode is entered as shown in FIG. 26B. Specifically, the last one of the images recorded in the built-in memory 104 and the removable memory 106 is displayed on the monitor 36 (step S76). Next, whether any of the switches or buttons is depressed or not is checked, and in the case where it is depressed in limit mode M2, whether the limit function is involved or not is checked based on the function limit table (step S78). On determining that the limit function is involved (step S80), the process returns to step S76 ignoring the depression of the switches or buttons.

In the case where the switch or button involves no limit function or the permit mode is in effect, on the other hand, the corresponding operation described below is performed. This operation can be performed based on either the operation commands from the switches and buttons of the camera proper 14 or the operation commands from the remote controllers 12, 70, 88.

Specifically, assume that the arrow switch 38 or 72 is depressed (step S82). In the case where the lower part (album) of the arrow switch 38 or 72 is depressed (step S84), the image recorded in the album (step S86) is displayed on the monitor 36. Upon depression of the menu button 42 or 76 while the particular image is being displayed (step S88), the album display function is ended and the process returns to step S78. Incidentally, the album is defined as a function in which the access point to each one of a group of images relating to a given event is written in the index information held separately from the image group so that upon designation of the album name, a series of the images about the event can be collectively displayed or otherwise collectively handled.

Upon depression of the upper part (calendar) of the arrow switch 38 or 72 (step S90), on the other hand, the images recorded for the current month are displayed in calendar form on the monitor 36 (step S92). Further, the arrow switch 38 or 72 makes it possible to display the images for the previous months or an image acquired on a selected day. Upon depression of the menu button 42 or 76 while this image is being displayed (step S94), the calendar display function is ended, and the process returns to step S78.

Also, upon depression of the right part (+) of the arrow switch 38 or 72 (step S96), the next image is displayed (step S98) and then the process returns to step S78. In the case where the current image is the last one, the first image is displayed. Also, upon depression of the left part (−) of the arrow switch 38 or 72 (step S100), on the other hand, the previous image is displayed (step S102), after which the process returns to step S78. Incidentally, in the case where the current image is the first one, the last image is displayed.

In the case where the OK button 40 or 74 is depressed (step S104), whether the current image is a dynamic one or not is confirmed (step S106), and in the case where it is not a dynamic image, the depression of the OK button 40 or 74 is ignored, and the process returns to step S78. In the case where the current image is a dynamic one, on the other hand, the dynamic image is displayed (step S108), and the process returns to step S78.

Upon depression of the zoom switch 44 (step S110) in the case where the T button is involved (step S112), the image being displayed is enlarged (step S114), and the process returns to step S78. Upon depression of the W button while the image is displayed in enlarged form, the display of one-frame image is restored. In the case where the W button is involved (step S116), the image being displayed is reduced as an index display (step S118) and the process returns to step S78. Each time the W button is depressed, a list of four, nine, sixteen and twenty five frames is displayed in that order. Each time the T button is depressed while the reduced list is being displayed, on the other hand, the display returns to the descendant order of 25, 16, 9, 4 and 1 frame. Incidentally, upon depression of the telephoto button 62 or the wide-angle button 64 of the remote controllers 12, 70, 88, the result is similar to the case in which the T button or the W button of the zoom switch 44 is depressed.

Upon depression of the erase button 46 or 82 (step S120), the confirmation as to whether the image is really erased or not is displayed on the monitor 36 (step S122), and in the case where the erase suspension is selected, the process returns to step S78 without erasure. In the case where the execution of the erase operation is selected, on the other hand, the particular frame is erased and the immediately preceding image is displayed (step S124), followed by returning to step S78. Incidentally, in the case where the image to be erased is protected, an alarm indicating that the image being displayed is to be protected is displayed on the monitor 36, and the selection to execute the erasure is ignored.

Upon depression of the print button 48 or 78 (step S126), the required printing operation such as the transmission of the image to the printer is performed (step S128), and the process returns to step S78.

Upon depression of the information button 80 (step S130), the accessorial information of the image is displayed on the monitor 36 (step S132), and the process returns to step S78.

Upon depression of the protection button 86 (step S134), the protection flag is attached to the image (step S136), and the process returns to step S78.

Upon depression of the rotation button 84 (step S138), the image displayed on the monitor 86 is rotated 90 degrees clockwise (step S140), and the process returns to step S78. Another depression rotates the image 90 degrees counter-clockwise, and still another depression restores the image to the original state.

Upon depression of the menu button 76 (step S142), the menu can be displayed and set. A multiplicity of menu functions are available, and can be set and changed in the same manner as described below in both the still image acquisition mode J1 and the dynamic image acquisition mode J2 described above.

The menu can be set in detail hierarchically from the top menu. The display content of the top menu is varied depending on the position of the select switch 32. Thus, the position of the select switch 32 is read (step S144) and the corresponding menu is displayed on the monitor 36 (step S146).

In the still image acquisition mode J2, the voice recording, macro, scene selection and the mode menu are displayed. In the dynamic image acquisition mode J2, on the other hand, the voice recording, macro, auto stabilization and the mode menu are displayed. In the play mode J3, the menu is varied with the content reproduced. Specifically, at the time of reproducing the still image, the storage play, information display, slide show and the mode menu are displayed. At the time of displaying a dynamic image, on the other hand, the storage play, information display, end of dynamic image play and the mode menu are displayed. At the time of voice reproduction, the storage play, information display, end of voice reproduction and the mode menu are displayed. At the time of calendar play, the calendar play end, information display, slide show and the mode menu are displayed. At the time of album play, the album selection, information display, album play end and the mode menu are displayed. The operation and display of the low-order menu of each case will not be described in detail, and the mode menu shared by all the cases will be explained.

Specifically, the displayed content of the mode menu is further varied depending on the position of the select switch 32. In the still image acquisition mode J1, the image quality mode switching, the sequential shooting mode setting, the exposure correction, the digital zoom setting, the white balance setting and the setting of selection of the memory for recording the image, etc., are possible. In the dynamic image acquisition mode J2, on the other hand, the image quality mode switching, the exposure correction, the digital zoom setting, the white balance setting, the full-time auto-focus setting and the setting of selection of the memory for recording the image, etc., are possible. In the play mode J3, the rotation display, the sound recording, the image editing, the image correction and the image synthesis are possible.

To end the menu operation, the menu button 76 is depressed again (step S148). Then, the process returns to step S78.

Also, on determining in step S28 that the prohibit mode M1 is in effect, the operation in prohibit mode as shown in FIG. 26C is entered. Specifically, first waiting for the commanding device information from the remote controller (step S150), and then determining the commanding device information from the remote controller constituting a commanding device, the operation is selected (step S152).

In the case where the commanding device information is the authentication mode switching command for setting or hanging the authentication mode (step S154), the operation described below is performed. Incidentally, also in the case where the authentication mode switching command is received in the authentication mode other than the prohibit mode, the operation described below is performed by interrupt.

Specifically, in the case where the authentication mode switching command is the prohibit command (step S156), the prohibit mode setting is displayed for confirmation on the monitor 36, and in the case where the image acquisition execution command is sent from the remote controller as the commanding device information, the mode is determined as established (step S158) and the prohibit mode M1 is set (step S160), while at the same time returning the process to step S150. Incidentally, the confirmation screen in step S158, though inserted as it is an important function to prevent the erroneous touch on the remote controller buttons and switch to the authentication mode, may be done without.

In the case where the authentication mode switching command is the limit command (step S162), the limit mode setting is confirmed and displayed on the monitor 36, and once the image acquisition execution command is sent from the remote controller as the commanding device information, the mode is determined as established (step S164), and by setting the limit mode M2 (step S166), the process returns to step S28. Incidentally, the confirmation screen in step S164, though inserted for confirmation as it is an important function to prevent the erroneous touch on the remote controller buttons and switch to the authentication mode, may be done without.

In the case where the authentication mode switching command is the setting command (step S168), the setting mode setting is confirmed and displayed on the monitor 36, and if the image acquisition execution command is sent from the remote controller as the commanding device information, the mode is determined as established (step S170), and the limit table is displayed on the monitor 36 or changed (step S172). Incidentally, the confirmation screen in step S170, though inserted as it is an important function to prevent the erroneous touch on the remote controller buttons and switching to the authentication mode, may be done without. Also, in the process of displaying or changing the limit table in step S372 described above, the function of the function limit table shown in FIG. 22 and the state of the limit flag are displayed on the monitor 36. Then, by using the plus and minus buttons 66, 68, the telephoto button and wide-angle buttons 62, 64 or the arrow switch 72 and the OK button 74, etc., of the remote controller, the circuit selection of the limit function is carried out while at the same time setting and changing the set/clear state of the flag. Once the setting change is ended, the image acquisition command button 58 is depressed, and therefore, in the case where the image acquisition execution command arrives, the content thereof is established (step S174) and the process returns to step S28.

In the case where the authentication mode switching command is the permit command (step S176), the permit mode setting is confirmed and displayed on the monitor 36, and if the image acquisition execution command is sent from the remote controller as the commanding device information, the mode is determined as established (step S178), and the permit mode M4 is set (step S180), and the process returns to step S28. Incidentally, the confirmation screen in step S178, though inserted as it is an important function to prevent the erroneous touch on the remote controller buttons and the switching to the authentication mode, may be done without.

Figure 26D:
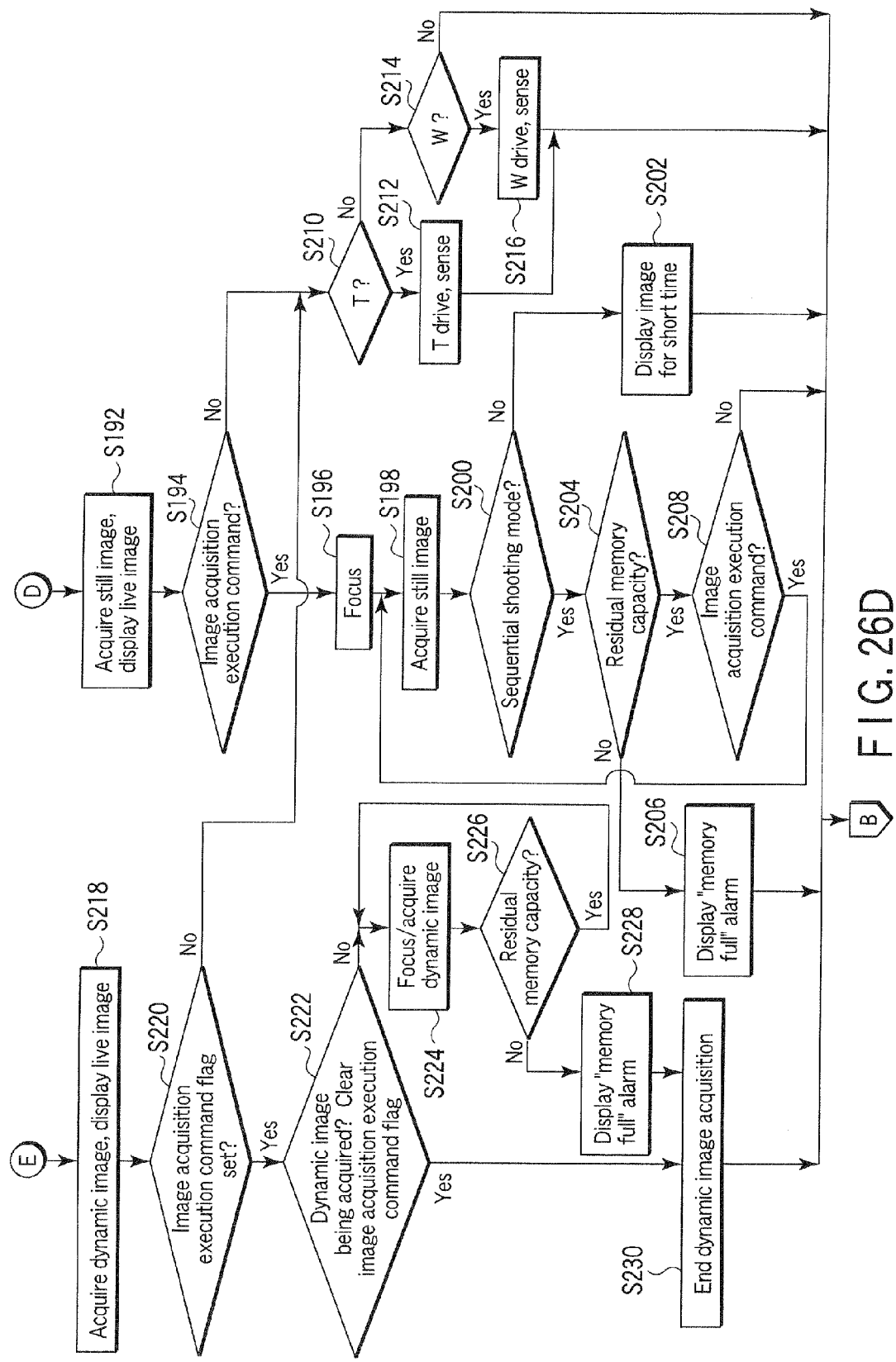
FIG. 26D is a diagram showing a fourth part of a series of flowcharts for explaining the process and the status transition in the image acquisition device.
Figure 26E:
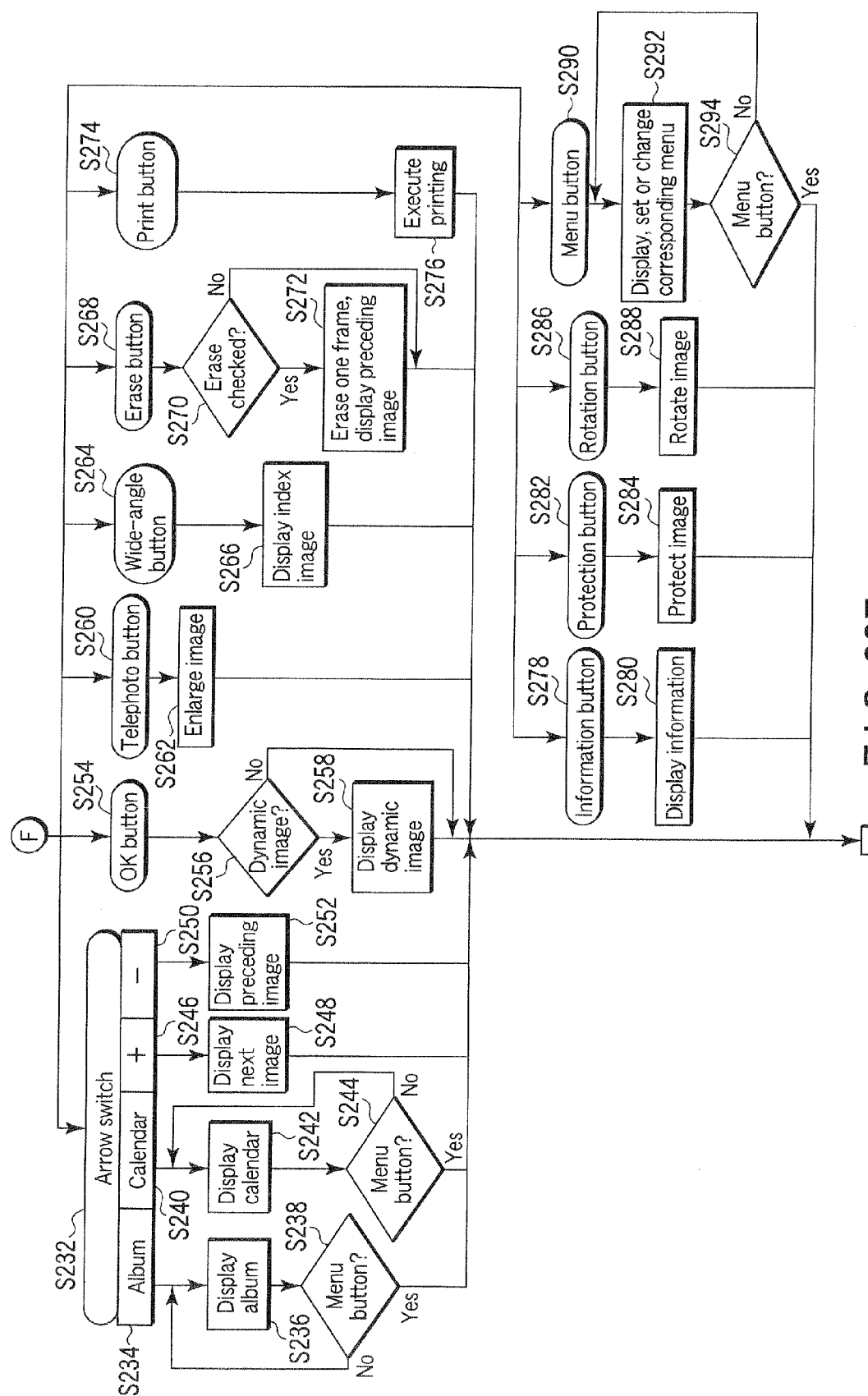
FIG. 26E is a diagram showing a fifth part of a series of flowcharts for explaining the process and the status transition in the image acquisition device.

Also, in the case where the commanding device information is the image acquisition command for image acquisition/playing operation (step S182), the state of the select switch 32 is read (step S184) and the corresponding operation performed. Specifically, in the case where the still image acquisition mode J1 (step S186) or the dynamic image acquisition mode J2 is set (step S188) by the select switch 32, the image acquisition operation with the operation of the remote controller in prohibit mode M1 as shown in FIG. 26D is entered. Also, in the case where the play mode J3 is set by the select switch 32 (step S190), the play operation by the operation of the remote controller in prohibit mode M1 as shown in FIG. 26E is entered.

In the still image acquisition mode J1, as shown in FIG. 26D, the live image is displayed on the monitor 36 (step S192) thereby to determine whether the image acquisition command received from the remote controller in step S150 is the image acquisition execution command or not (step S194). On determining that the image acquisition command is the image acquisition execution command, the focusing operation is performed (step S196) to acquire the still image (step S198), followed by determination of whether the sequential shooting mode is set or not (step S200). In the case where the sequential shooting mode is not set, an image already acquired is displayed for a short time on the monitor 36 (step S202), after which the process returns to step S150.

In the case where the sequential shooting mode is set, on the other hand, whether the built-in memory 104 and/or the removable memory 106 has at least a predetermined amount of the residual memory capacity or not (step S204). In the case where the residual memory capacity is zero, the "memory full" alarm is displayed on the monitor 36 (step S206), and the process returns to step S150. In the case where the residual memory capacity is not zero, on the other hand, whether the image acquisition execution command has arrived or not is confirmed (step S208), and if it has not arrived, the process returns to step S150. In the case where the image acquisition execution command has arrived, on the other hand, the process returns to step S198 to acquire the next image.

Also, in the case where step S194 determines that the received image acquisition command is not the image acquisition execution command, whether the image acquisition command is the T button command as the result of depression of the telephoto button 62 or not is determined (step S210). On determining that the T button command is involved, the lens unit 16 is driven to the telephoto side as long as the T button command comes (step S212), and once the T button command stops, the drive is suspended and the process returns to step S150.

On determining in step S210 that the T button command is not received, on the other hand, whether the image acquisition command is the W button command due to the depression of the wide-angle button 64 or not is determined (step S214). On determining that the W button command is involved, the lens unit 16 is driven to the wide-angle side as long as the W button command arrives (step S216), and once the W button command is stopped, the drive is suspended, and the process returns to step S150. On determining in step S214 that the W button command is not involved, the process returns to step S150.

In the dynamic image acquisition mode J2, on the other hand, the live image is displayed on the monitor 36 (step S218) thereby to determine whether the image acquisition execution command flag is set or not upon reception of the image acquisition execution command upon depression of the image acquisition command button 58 (step S220). On determining that the image acquisition execution command flag is set, determination is made as to whether the dynamic image is being acquired or not while at the same time clearing the image acquisition execution command flag (step S222). On determining that the dynamic image is not being acquired, on the other hand, the focusing operation is performed and the dynamic image acquisition operation started (step S224). Then, the residual memory capacity of the built-in memory 104 and/or the removable memory 106 is checked (step S226). In the case where the residual memory capacity is zero, the "memory full" alarm is displayed on the monitor 36 (step S228) thereby to end the dynamic image acquisition operation (step S230), and the process returns to step S150. In the case where the residual memory capacity is not zero, on the other hand, the process returns to step S224 to continue the dynamic image acquisition operation. Also, in the case where step S222 determines that the dynamic image is being acquired, the process proceeds to step S230 to end the image acquisition operation, followed by returning to step S150.

On determining in step S220 that the image acquisition execution command flag is clear, the process proceeds to step S210 to determine whether the T button command is issued or not. In the case where the T button command is issued, the lens unit 16 is driven to the telephoto side as long as the T button command arrives (step S212), while once the T button command stops, the drive is suspended, and the process returns to step S150. On determining in step S210 that the T button command is not issued, on the other hand, determination is made as to whether the W button command is issued or not (step S214). In the case where the W button command is issued, the lens unit 16 is driven to the wide-angle side as long as the W button command arrives (step S216). Once the W button command ceases to arrive, the drive is suspended, and the process returns to step S150. In the case where the W button command is not involved, the process returns to step S150.

As described above, while the dynamic image acquisition operation is going on, the particular dynamic image operation can be ended or the zoom operation can performed by an interruption due to the receipt of the image acquisition execution command or the T or W button command.

With regard to the dynamic image, the recording time can be limited to, say, 15 seconds, and in accordance with the memory capacity corresponding to the number of seconds of the particular time, the residual memory capacity is determined in step S226. In this way, the dynamic image acquisition operation can be automatically ended.

In play mode J3, on the other hand, the last image recorded in the built-in memory 104 or the removable memory 106 is displayed on the monitor 36, and the operation corresponding to the switches and buttons of the remote controllers 12, 70, 88 is performed.

Specifically, as shown in FIG. 26E, in the case where the commanding device information received from the remote controller in step S150 is the operation command for the arrow switch 72 (step S232), and in the case where the operation is the down operation command (album) by down switch operation of the arrow switch 72 (step S234), then the image recorded in the album is displayed on the monitor 36 (step S236). Upon depression of the menu button 76 while this image is being displayed (step S238), the album display function is ended and the process returns to step S150.

In the case of the up operation command (calendar) by the up switch operation of the arrow switch 72 (step S240), on the other hand, the images recorded for the current month are displayed in calendar form on the monitor 36 (step S242). Further, the images for the previous months or the images acquired for the selected day can be selected and displayed by the arrow switch 72. Upon depression of the menu button 76 during this display (step S244), the calendar display function is ended and the process returns to step S150.

Also, in the case of the right operation command by the right switch operation of the arrow switch 72 (step S246), the next image is displayed on the monitor 36 (step S248), and the process returns to step S150. Incidentally, assuming that this right switch is operated in the case where the current image is the last one, the first image is displayed.

Also, in the case of the left operation command due to the left switch operation of the arrow switch 72 (step S250), the previous image is displayed on the monitor 36 (step S252) and the process returns to step S150. Incidentally, in the case where the current image is the first one, the last image is displayed by the left switch operation.

Also, in the case where the image acquisition command received from the remote controller in step S150 is the OK command by the operation of the OK button 74 (step S254), whether the current image is a dynamic one or not is checked (step S256), and if not a dynamic image, it is ignored and the process returns to step S150. In the case of a dynamic image, on the other hand, the particular dynamic image is displayed (step S258) and the process returns to step S150.

In the case where the image acquisition command received from the remote controller in step S150 is the T button command issued by the operation of the telephoto button 62 (step S260), the image displayed on the monitor 36 is enlarged (step S262) and the process returns to step S150. Incidentally, upon depression of the wide-angle button 64 while the image is displayed in enlarged form, the one-frame image display is restored.

Also, in the case where the image acquisition command received from the remote controller in step S150 is the W button command issued by the operation of the wide-angle button 64 (step S264), on the other hand, the image displayed on the monitor 36 is reduce and displayed in the form of index (step S266), and the process returns to step S150. Incidentally, each time the wide-angle button 64 is depressed, lists of four, nine, 16 and 25 frames can be displayed in that order. Also, each time the telephoto button 62 is depressed while a reduction list is being displayed, the display is restored from 25, 16, 9, 4 and 1 frame in that order.

Also, in the case where the image acquisition command received from the remote controller in step S150 is the erase command due to the operation of the erase button 82 (step S268), the confirmation as to whether the image is really erased or not is displayed on the monitor 36 (step S270), and in the case where the erase suspension is selected, the process returns to step S150 without erasure. In the case where the erasure execution is selected, on the other hand, the particular frame is erased and the immediately preceding image is displayed (step S272), followed by returning the process to step S150. Incidentally, in the case where the image to be erased is protected, the fact that the image is protected is displayed as an alarm on the monitor 36, and the erasure execution is ignored.

Also, in the case where the image acquisition command received from the remote controller in step S150 is the print command due to the operation of the print button 78 (step S274), the required print operation such as the image transmission to the printer is carried out (step S276), and the process returns to step S150.

Also, in the case where the image acquisition command received from the remote controller in step S150 is the information display command due to the operation of the information button 80 (step S278), the information on the image displayed on the monitor 36 is displayed (step S280), and the process returns to step S150.

Also, in the case where the image acquisition command received from the remote controller in step S150 is the protection command due to the operation of the protection button 86 (step S282), the protection flag is attached to the image displayed on the monitor 36 (step S284), and the process returns to step S150.

Also, in the case where the image acquisition command received from the remote controller in step S150 is the rotation command due to the operation of the rotation button 84 (step S286), the image displayed on the monitor 36 is rotated 90 degrees clockwise (step S288) and the process returns to step S150. Incidentally, another depression of the rotation button 84 rotates the image 90 degrees counterclockwise. Still another depression restores the original image.

Also, in the case where the image acquisition command received from the remote controller in step S150 is the menu command due to the operation of the menu button 76 (step S290), the menu can be displayed and set. The menu can be set in detail hierarchically from the top menu. In this case, the play mode J3 is in effect, and therefore, the corresponding top menu is displayed on the monitor 36 (step S292). Depending on the contents played, however, a different menu is displayed.

Specifically, at the time of still image reproduction, storage play, information display, slide show and the mode menu are displayed. At the time of dynamic image reproduction, on the other hand, the storage play, information display, dynamic image play end and the mode menu are displayed. At the time of voice reproduction, the storage play, information display, voice play end and the mode menu are displayed. At the time of the calendar play, the calendar play end, information display, slide show, and the mode menu are displayed. At the time of the album play, the album selection, information display, album play end and the mode menu are displayed. Although the detailed explanation of the operation and the display of the low-order menu is omitted for each case, a common mode menu will be explained. In mode menu, the rotation display, sound recording, image editing, image correction and the image synthesis can be carried out. To end the menu operation, the menu button 76 is depressed again (step S294), thereby returning to step S150.

In the case where step S28 determines that the setting mode M3 is in effect, on the other hand, as shown in FIG. 26F, the setting mode is entered. Specifically, in the setting mode, the functions of the function limit table shown in FIG. 22 and the state of the limit flag are displayed on the monitor 36, and by using the plus and minus buttons 66, 68, the telephoto button and wide-angle buttons 62, 64 or the arrow switch 72 and the OK button 74, the circuit selection of the limit function and the flag set/clear setting and change are carried out (step S296). Once the setting or change is over, the image acquisition command button 58 is depressed. Thus, upon receipt of the image acquisition execution command thereof, the content is established (step S298), and the process returns to step S28 to read the authentication mode.

As described above, according to the first embodiment of the invention, the authentication information is held in the remote controllers 12, 70, 88 separated from the camera proper 14, and the authentication information is set in the camera proper 14. Should the camera proper 14 is lost, therefore, the predetermined functions such as the reproduction of the acquired images are limited in the absence of the authentication information from the remote controllers 12, 70, 88, thereby making it possible to maintain security.

Also, by using the small remote controllers 12, 70, 88 for dual purpose of image acquisition and authentication, an easy-to-operate security system that can be carried with a small burden is realized.

Also, the functions of the switches and buttons of the remote controllers 12, 70, 88 can be switched by the authentication setting switch 60, so that the number of the switches and buttons can be reduced for a smaller device size.

Also, by setting the camera proper 14 in prohibit mode M1 at the time of switching on power, the camera proper 14 cannot be used by itself unless a command is issued from the remote controllers 12, 70, 88 or the current authentication mode is switched to another authentication mode by the remote controllers 12, 70, 88. In other words, the camera proper 14 can be locked.

As an alternative, the authentication mode set at the time of disconnecting the power supply can be held. In this case, the authentication mode, if stored in a nonvolatile memory, can be kept held. Then, at the time of switching on the camera proper 14, the authentication mode thus stored is read and set. In this way, the camera proper 14 can be activated in the previous authentication mode.

Also, in the case where the arrangement is made so that the authentication mode can be changed only from the remote controllers 12, 70, 88, the situation can be prevented in which the authentication mode is changed and the acquired images are reproduced by a third party having none of the remote controllers 12, 70, 88.

Also, in view of the fact that the camera proper 14 can be set in prohibit mode M1 by the prohibit timer 140, a comparative security is maintained even in the rare case where the camera proper 14 is stolen. In this case, a configuration, if employed, in which the time continues to be counted even after the power is switched off and the prohibit mode comes to be set in a predetermined time, eliminates the trouble of switching the authentication mode each time the power is switched off. Further, by making such an arrangement that in the case where the battery is consumed up or removed, the prohibit mode M1 is set immediately or after a preset time taking the presence or absence of a backup battery or capacitor into consideration or based on the result of monitoring the voltage, then the situation can be avoided in which the battery 138 is intentionally or accidentally removed or left used up and the life of the backup battery and capacity also expires, with the result that neither the prohibit timer 140 can work to count nor the prohibit mode can be set on the lapse of a preset time, thereby making it impossible to use the digital camera 10.

Also, since the commanding device information is transmitted/received optically or by radio, the user is not required to carry the cable or the like to connect the camera proper 14 and the remote controllers 12, 70, 88.

Incidentally, a plurality of types of remote controllers 12, 70, 88 for transmitting image acquisition commands of different functions are available, and therefore, the user can use any remote controller capable of transmitting the image acquisition command of the desired function. Further, for executing the function such as the reproduction required to protect the privacy, the remote controllers such as 12, 70, 88 having the authentication function capable of transmitting the authentication information are required. The image acquisition operation, which itself requires no privacy protection, however, can be performed using another remote controller (not shown) capable of transmitting a command related only to the image acquisition function without the authentication information. For a travel or the like application, for example, a remote controller having only the limited image acquisition function may be carried while the remote controller with the authentication function can be left in home. Then, the image acquisition operation can be freely carried out, and even if the camera proper 14 and the remote controller are lost or stolen while traveling, the third party thief of the camera proper 14 does not possess the remote controller with the authentication function left by the owner in home, and therefore, the security of the acquired images can be protected.

[Second Embodiment]

Now, a second embodiment of the invention will be explained.

In the case where an acquired image is recorded in a removable memory 106 in a standardized format, assume that the camera proper 14 is set in prohibit mode M1 and cannot be used. Even in that case, the removable memory 106 may be pulled off from the camera proper 14 and the images therein may be reproduced on another device, resulting in the leakage of information. In view of this, according to this embodiment, the image acquired in prohibit mode M1 is recorded only in the built-in memory 104, so that as long as the camera proper 14 remains in prohibit mode M1, the image cannot be reproduced by other than the remote controller having the authentication function.

Specifically, unlike in the first embodiment described above, the still image acquired in step S198 is recorded only in the built-in memory 104 and the residual memory capacity is checked in step S204 only for the built-in memory 104. Also, the dynamic image acquired in step S224 is stored only in the built-in memory 104 and the residual memory capacity checked in step S26 only for the built-in memory 104. Further, in the case where the image recorded in the built-in memory 104 is copied or transferred to the removable memory 106 using the menu function (step S294), the particular image is encrypted by the encryption/decryption circuit 122 or by the main control unit 110 using a program. At the time of returning the image recorded in encrypted form in the removable memory 106 to the built-in memory 104 or reproducing it in the camera proper 14, the particular image is decrypted by the encryption/decryption circuit 122 or the main control unit 110 with the program.

Also, the owner may be desirous of hiding some image acquired in limit mode M2 or permit mode M4. In such a case, the owner of the camera proper 14 can prevent the loss of an image which otherwise might be caused by the removal of the removable memory 106, in such a manner that the prohibit timer 140 is set for a short time and the image acquired in limit mode M2 or permit mode M4 is recorded only in the built-in memory 104 but not in the removable memory 106 to prevent the image reproduction without the remote controller having the authentication function after entering the prohibit mode M1.

Specifically, the menu designating the place of recording the image as included as one of the set items of the menu, i.e., the built-in memory 104 only or the removable memory 106 only, or both the built-in memory 104 and the removable memory 106 with the priority given to one of them to record the image whenever the other is filled up.

Incidentally, to assure safe recording, the record selection menu may be so configured as to be capable of being set only with the menu (step S294) during the reproduction in prohibit mode M1.

As described above, according to the second embodiment of the invention, the image acquired by the camera proper 14 in prohibit mode M1 is stored in the built-in memory 104, and therefore, cannot be read by other devices. Also, as long as the camera proper 14 remains in prohibit mode M1, the image cannot be reproduced, copied, transferred or printed without the remote controllers 12, 70, 88 having the authentication function. Further, the image in the built-in memory 104, if transferred to the removable memory 106, is stored in encrypted form, thereby making it also possible to maintain the security of the images in the built-in memory 104. Also, the user can select whether the acquired image is to be recorded either in the built-in memory 104 or in the removable memory 106.

[Third Embodiment]

Next, a third embodiment of the invention will be explained.

According to this embodiment, the acquired image is stored together with the authentication mode information.

In the Exif (Exchangeable image file format: Japan Electronics and Information Technology Industries Association [JEITA] Standard) format, as shown in FIG. 27, each image file is recorded in rough divisions including a header 166, a thumbnail 168 as a reduced image and image data 170.

The contents of the header 166 are varied and include the information on the pixel structure such as image width, the information on compression such as the image compression type, the information on the image acquisition conditions such as the image acquisition date/hour, the device model and the exposure time, the information such as the color space, the information related to GPS and other information. According to this embodiment, the authentication mode information is further recorded in the header 166.

The authentication mode includes four modes as explained in the first embodiment. Since the setting mode is not related to the image recording, however, only the three modes including the permit mode M4, the limit mode M2 and the prohibit mode M1 are required to be identified, for which the information of 2 bits or three characters are sufficient. Specifically, the type of the authentication mode is recorded in the user comment of the Exif IFD Tag 37510, the maker note of the tag 37500 or the image title of the tag 270, and at the time of reading the image, the authentication mode information is checked to determine whether the image is to be displayed or not.

Incidentally, the authentication mode information can be added also by the method described below.

FIG. 28 is a diagram showing an example of the album index in the case where a group of images are held in album form. In the case under consideration, three album indexes 172A, 172B and 172C are shown. Each image file is recorded in the format of the JPEG (Joint Photographic Expert Group) standard and the image is managed in album form. To handle the image files for a given event collectively, the index information is prepared in addition to the image file group, and the access pointer to the image file is written in the index information. In this way, a series of images can be collectively displayed by designation of the album name. In the case of the album index 172A, for example, the four image files including 101.jpg, 102.jpg, 104.jpg and 108.jpg are registered, and by designating this album index 172A, the four image files can be retrieved sequentially. Also, by adding the authentication mode information to the pointers of the album indexes 172A to 172C, the determination can be made as to whether an image is to be displayed or not by checking the authentication mode at the time of reading the particular image.

Also, as shown in FIG. 29, the authentication mode information may be recorded as accessorial data of each image file 174.

FIG. 30A is a diagram showing an example of a case in which the authentication mode information is buried in the image. The information buried is of three types as described above, and two least significant bits (LSBs) of the pixel of the image 176 are used sufficiently. Thus, a watermark 178 is buried at a corner not so conspicuous. Specifically, as shown in FIG. 30B, the bits "01", "10" and "11", for example, corresponding to the permit mode M4, the limit mode M2 and the prohibit mode M1, respectively, are recorded in the LSBs of two pixels. At the time of reading the image, the authentication mode is checked by this watermark 178 to determine whether the image is to be displayed or not.

Also, to permit the visual confirmation of the authentication mode at the time of displaying the image, as shown in FIG. 30A, an authentication mode identification symbol 180 such as "A" may be recorded in a part of the image. In this case, the program for recognizing the character information recorded in a specified place in the image 176 is packaged to determine the authentication mode.

As described above, according to the third embodiment of the invention, the acquired image is stored with the authentication mode information attached thereto, and therefore, at the time of reading the image, the authentication mode information is checked to determine whether the image is to be displayed or not. In this case, the image to be reproduced, to which the authentication mode information is added, is reproduced as long as the particular authentication mode information indicates the same authentication mode as the present authentication mode of the camera proper 14.

[Fourth Embodiment]

Next, a fourth embodiment of the invention will be explained.

This embodiment uses, as the authentication information, the variable remote controller identification information in addition to the fixed remote controller identification information.

As shown in FIG. 31, according to this embodiment, a random number generator 182 or a data table 184 is included in the control unit 142 of the remote controllers 12, 70, 88 as a means to generate the variable remote controller identification information.

The random number generator 182 may be of such a type that the random number is generated by the random number generation program such as the mixed congruential method or the linear congruential method using the CPU of the control unit 142, or of such a type that a pseudo-random number may be generated by a logic circuit such as a combination of a shift register and an exclusive-OR gate.

FIG. 32 is a diagram showing an example of the data table 184 as a random number table of 100 two-digit numerical values.

As described above, the use of the variable remote controller identification information in addition to the fixed remote controller identification information can improve the security against the duplication of the remote controller by the wiretapping of the past commanding device information from the remote controller.

This variable remote controller identification information may be used with or without the fixed remote controller identification information.

Figure 33C:
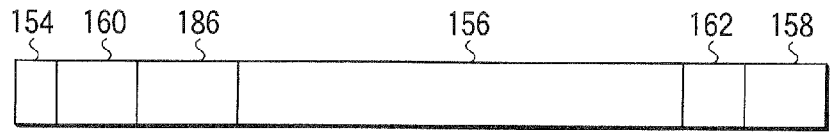
FIG. 33C is a diagram showing the data format of the transmission data signal from the remote controller in the case where the variable remote controller identification information is added.

FIGS. 33A to 33C, for example, are diagrams showing the data format of the transmission data signal from the remote controllers 12, 70, 88 in the case where the independent variable remote controller identification information 186 is attached in place of the fixed remote controller identification information 164 shown in FIGS. 18A to 18C. As shown in these diagrams, the random number generated in the remote controller control unit 142 or the value selected from the data table 184 may be added as the variable remote controller identification information 186 and transmitted. This independent variable remote controller identification information 186 can of course be transmitted in the form not as an addition but contained in a part of the data portion 156 or the header 160 (in the latter case, the data format shown in FIGS. 17A to 17C is used).

Next, how to use the variable remote controller identification information 186 will be explained. The camera proper 14, once set in prohibit mode M1, can be operated only in accordance with the command from the remote controllers

12, 70, 88. In order to improve the security of this command from the remote controller, the variable remote controller identification information 186 is added to the command from the remote controllers 12, 70, 88, so that only the command of the remote controllers 12, 70, 88 having the coincident information is accepted. The prohibit command is transmitted, if any, from the remote controllers 12, 70, 88 together with the random number generated by the random number generator 182 or the value selected from the data table 184. The camera proper 14 stores this random number or the numerical value, as the case may be, at the time of transfer to the prohibit mode M1. This random number or the numerical value is attached to the command other than the prohibit command which may be subsequently sent to the camera proper 14 from the remote controllers 12, 70, 88. On the part of the camera proper 14, this random number or the value is checked with the stored value for coincidence, and only in the case where they are coincident with each other, the particular command is executed. The stored value is erased with the arrival of a command to set the mode other than the prohibit mode M1, i.e., a command to switch to the permit mode M4, the limit mode M2 or the setting mode M3 (the permit command, the limit command or the setting command) from the remote controllers 12, 70, 88.

In the case where the remote controllers 12, 70, 88 transmit a prohibit command anew, the random number next to the one newly generated by the random number generator 182 or the next value selected from the data table 184 is attached to the prohibit command transmitted. This next random number or this next value is stored in the camera proper 14, after which the command is executed upon confirmation of coincidence.

Figure 34:
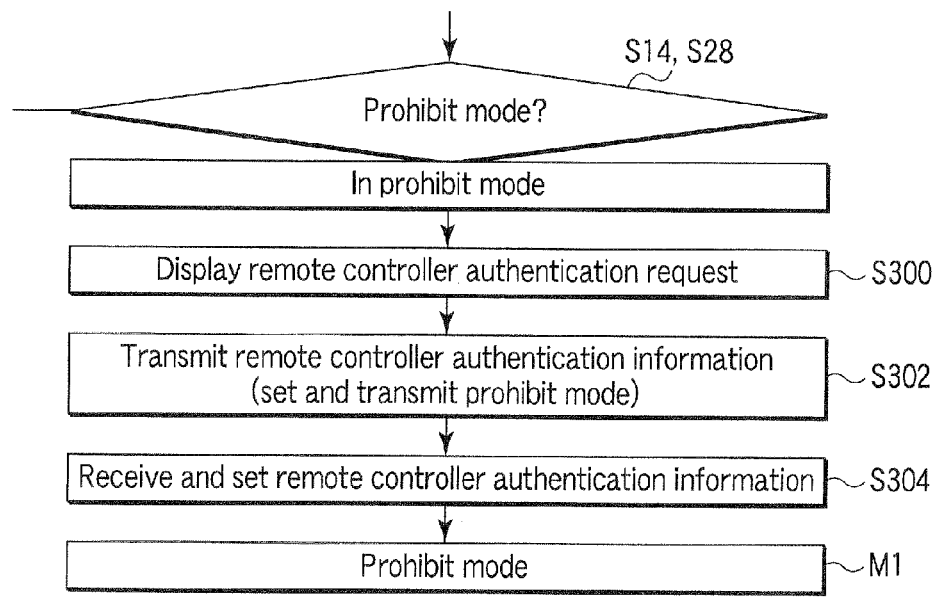
FIG. 34 is a diagram showing the flowchart for explaining the variable remote controller identification information request and the setting at the time of switching on the power of the camera proper.

Next, the request and setting of the variable remote controller identification information at the time of switching on the power of the camera proper 14 will be explained with reference to FIG. 34.

When the power of the camera is switched on, the authentication mode is designated for setting as shown in FIG. 21 and set to the mode stored in the mode memory 128. In this case, the camera proper 14, if set to the prohibit mode M1, cannot obtain the variable remote controller identification information 186 of the remote controllers 12, 70, 88. In the case where the camera proper 14 is switched to the prohibit mode M1 at the time of switching on power, i.e., in the case where the prohibit mode M1 is set in step S12 or S28, therefore, the request to transmit the variable remote controller identification information is displayed on the monitor 36 of the camera proper 14 (step S300). The operator, viewing this display, sends the prohibit command from the remote controllers 12, 70, 88 and thus transmits the variable remote controller identification information to the camera proper 14 (step S302). The camera proper 14 stores this variable remote controller identification information 186 (step S304).

In the subsequent case where the command other than the prohibit command is sent from the remote controllers 12, 70, 88 to the camera proper 14, the command is accompanied by the variable remote controller identification information 186. The camera proper 14 checks the coincidence between the variable remote controller identification information 186 and the value stored in step S304, and only when they are coincident with each other, executes the command.

After that, the stored value is erased with the arrival, if any, of the command (the permit command, the limit command, the setting command) to switch to the mode other than the prohibit mode M1, i.e., the permit mode M4, the limit mode M2 or the setting mode M3 from the remote controllers 12, 70, 88. In the case where the remote controllers 12, 70, 88 transmit a prohibit command anew, new variable remote controller identification information 186 is transmitted and stored in the camera proper 14, after which the command is executed upon confirmation of coincidence.

As described above, according to the fourth embodiment of this invention, the variable authentication information is generated using the random number generated in the random number generator 182 or the value selected from the data table 184. In this way, the security can be improved against the duplication of the commanding device by wiretapping of the past commanding device information from the commanding device.

[Fifth Embodiment]

Next, a fifth embodiment of the invention will be explained.

Figure 35:
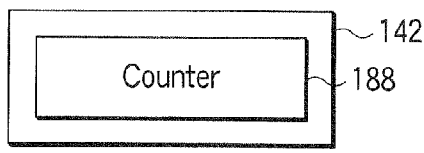
FIG. 35 is a diagram showing the configuration of the control unit of the remote controller according to a fifth embodiment of the invention.
Figure 36:
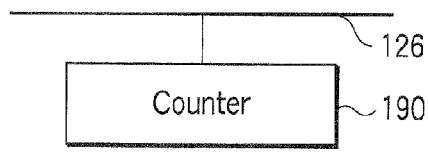
FIG. 36 is a diagram showing the configuration of the camera proper according to the fifth embodiment.

According to this embodiment, the control unit 142 of the remote controllers 12, 70, 88 includes a counter 188 therein as shown in FIG. 35. Also, the camera proper 14 includes a counter 190 connected to the bus 126, as shown in FIG. 36. According to this embodiment, the reliability of the commanding device information from the remote controllers is improved using the counters 188, 190.

Specifically, as shown in FIG. 37, in the case where the operation is performed to switch the authentication mode by executing the steps on the remote controllers 12, 70, 88 as explained above in the first embodiment, the first process is to erase the count on the counter 188 in the remote controllers (step S306). At the time of transmitting the authentication mode switching command, the counting operation is started on the counter 188 (step S308). On the part of the camera proper 14, on the other hand, upon receipt of the authentication mode switching command from the remote controllers 12, 70, 88, the count on the counter 190 is erased (step S310) and the authentication mode is switched to the mode designated in the command while at the same time starting the counting operation on the counter 190 (step S312).

Subsequently, if any one of the buttons on the remote controllers 12, 70, 88 is depressed (step S314), the count on the counter 188 is read (step S316), and the commanding device information with the count is transmitted (step S318). The camera proper 14, upon receipt of the commanding device information (step S320), reads the count on the counter 190 in the camera proper 14 (step S322) and compares it with the count from the remote controllers 12, 70, 88. In the case where the two counts are equal to each other within the tolerance taking the count error between them into consideration (step S324), the operation corresponding to the particular commanding device information is carried out (step S326).

Figure 38A:
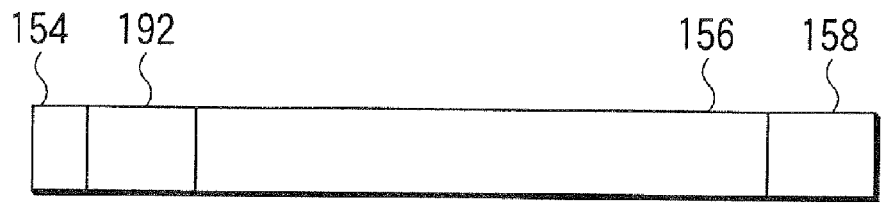
FIG. 38A is a diagram showing the data format of the transmission data signal from the remote controller.
Figure 38B:
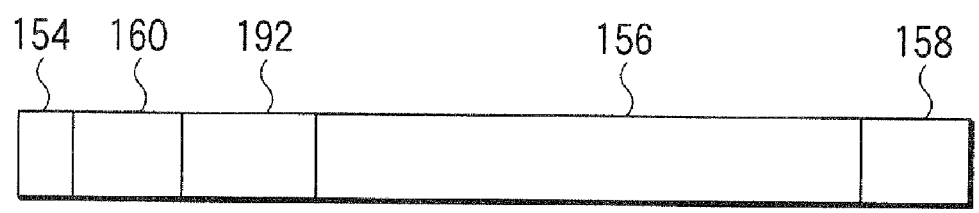
FIG. 38B is a diagram showing the data format of the transmission data signal from the remote controller.
Figure 38C:
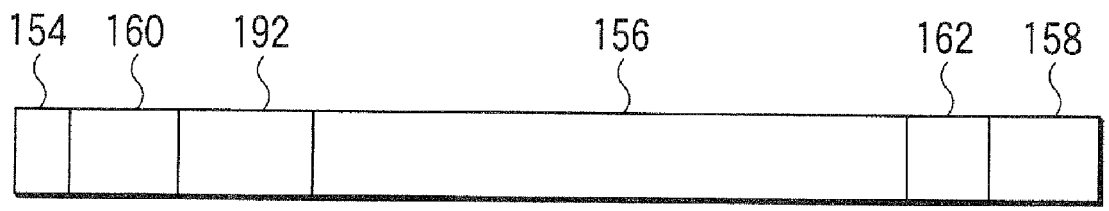
FIG. 38C is a diagram showing the data format of the transmission data signal from the remote controller.

FIGS. 38A to 38C are diagrams showing the data format of the transmission data signal from the remote controllers 12, 70, 88, which takes the form with the count 192 on the counter 188 added to the data format shown in FIGS. 17A to 17C. Incidentally, the fixed remote controller identification information 164, if added, can be transmitted in the form contained in the data portion 156 or the header 160 as shown in FIGS. 18A to 18C.

As described above, by starting the counting on the remote controllers 12, 70, 88 and the camera proper 14 with the switching of the authentication mode as a starting point and checking for the coincidence, only the command from the remote controllers having the coincident count can be accepted.

The counting method includes the one in which the command is counted as 1, 2, 3, . . . each time it is issued or counted as 1, 2, 3, . . . each time the signal received is checked for coincidence, or the one in which the time is counted on the timer. Even in the case where there are a plurality of remote controllers of the same type, the command from other remote controllers is not accepted as long as the authentication information changes and the count fails to coincide. As compared with the case in which only the fixed remote controller identification information is used for determination, therefore, the security can be further improved with a simple mechanism.

As described above, according to the fifth embodiment of the invention, the remote controllers 12, 70, 88 and the camera proper 14 each start the counting operation with the switching of the authentication mode as a starting point, and after the coincidence is checked, the camera proper 14 can accept only the command with a coincident count.

[Sixth Embodiment]

Next, a sixth embodiment of the invention will be explained.

In order to improve the confidentiality of the image already acquired, according to this embodiment, the operation is performed also with the image acquisition execution command without the authentication information or with the command of the telephoto button 62 and the wide-angle button 64 having the zoom function in the image acquisition modes J1, J2. In play mode J3, on the other hand, the operation is performed only with the commanding device information having the authentication information.

Figure 39:
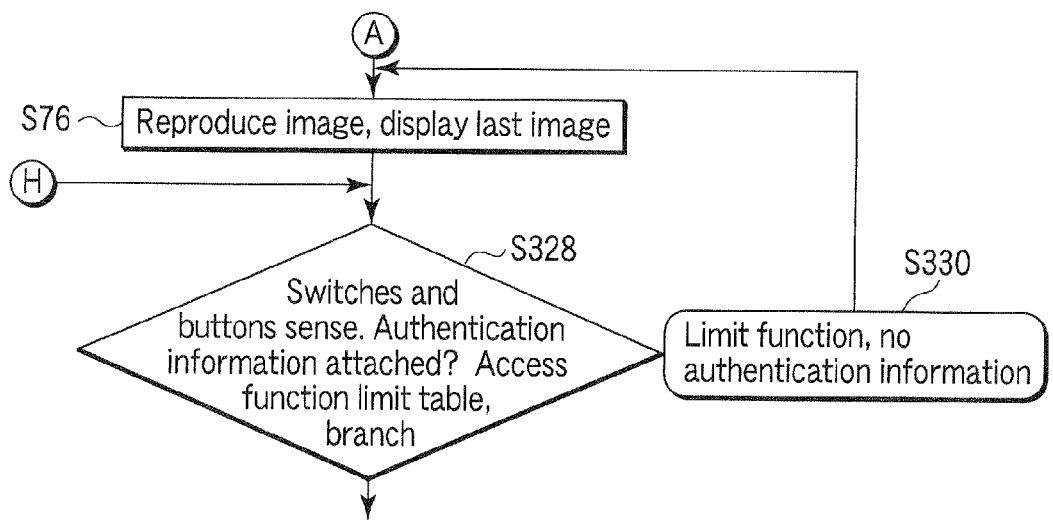
FIG. 39 is a diagram showing the flowchart for explaining the operation of the camera proper according to a sixth embodiment.

For this purpose, the select switch 32 is read and branches to the play mode J3 in step S30, and on determining in step S74 that the data is reproducible, the last image is displayed on the monitor 36 in step S76. After that, unlike in the first embodiment in which step S78 branches into the switch, the button sense and access to the function limit table, this embodiment further determines whether the authentication information is added to the commanding device information or not as shown in FIG. 39 (step S328). In the case where the authentication information is not so added, the limit function is determined as being in effect or the authentication information is determined as being absent (step S330), and by ignoring the depression of the switches and the buttons, the process returns to step S76.

Figure 40:
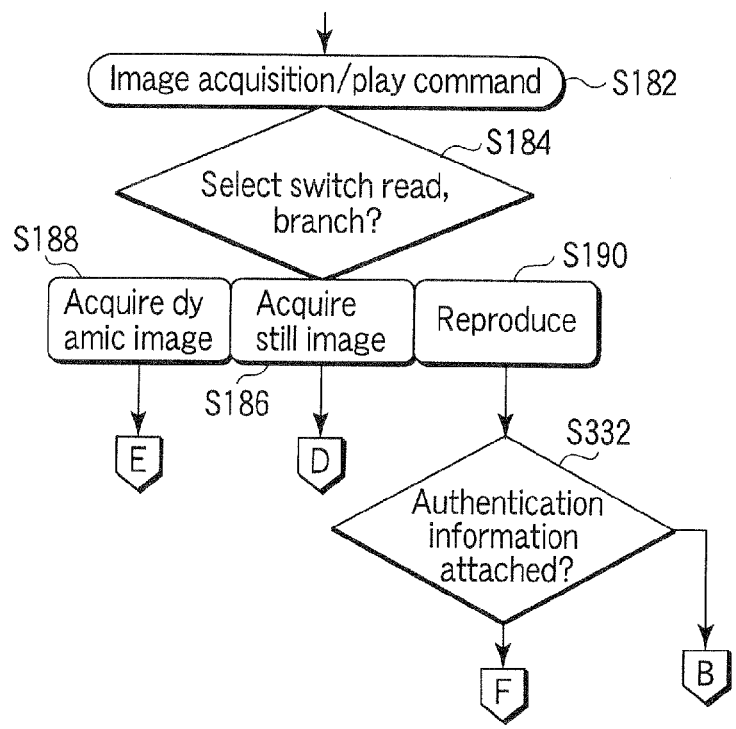
FIG. 40 is a diagram showing the flowchart for explaining the operation of the camera proper according to the sixth embodiment.

Also, on determining in step S184 that the play mode J3 is in effect by reading the state of the select switch 32 (step S190), this embodiment, as shown in FIG. 40, determines further whether the authentication information is added or not to the commanding device information (step S332). In the case where the authentication information is so added, the play operation is started by the remote controller in prohibit mode M1 as described above, while in the case where the authentication information is not added, on the other hand, the process returns to step S76.

Figure 41A:
FIG. 41A is a diagram showing the data format of the transmission data signal from the remote controller.
Figure 41B:
FIG. 41B is a diagram showing the data format of the transmission data signal from the remote controller.
Figure 41C:
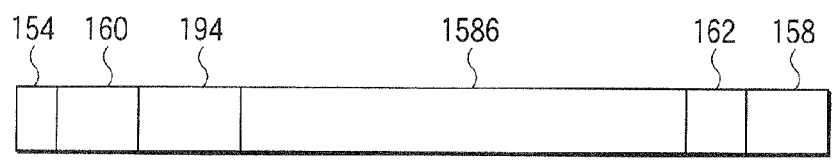
FIG. 41C is a diagram showing the data format of the transmission data signal from the remote controller.
Figure 41D:
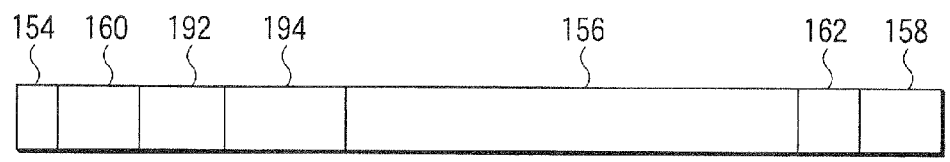
FIG. 41D is a diagram showing the data format of the transmission data signal from the remote controller.
Figure 41E:
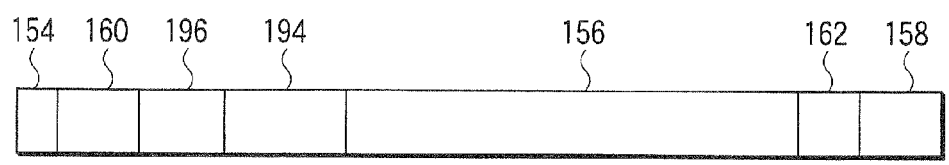
FIG. 41E is a diagram showing the data format of the transmission data signal from the remote controller.

FIGS. 41A to 41D are diagrams showing other formats of the transmission data signal of the commanding device information including the function range designation information 194, or especially, the authentication mode switching command from the remote controllers 12, 70, 88, and FIG. 41E a diagram showing another format of the transmission data signal of the commanding device information including the ID information 196 and the function range designation information 194. The function range designation information 194 and the ID information 196, though explained below in the form added to the data format of the transmission data signal from the remote controllers 12, 70, 88, may alternatively be contained, together with the commanding device information, in the n bytes of the data portion 156. Also, the fixed remote controller identification information 164 can be transmitted in the form contained in the data portion 156 in FIG. 41A; in the header 160 or the data portion 156 in FIGS. 41B and 41C; in the header 160, the count 192 or the data portion 156 in FIG. 41D; and in the header 160, the ID information 196 or the data portion 156 in FIG. 41E.

FIG. 41A is a diagram showing a case in which the function range designation information 194 for designating the range of the available functions is contained in the commanding device information, or especially, in the authentication mode switching command. As this function range designation information 194, the limit flag of the function limit table shown in FIG. 22 may be used in correspondence in units of bits or bytes. FIG. 41B shows a case in which the header 160 and the function range designation information 194 are contained, FIG. 41C a case in which the header 160, the function range designation information 194 and the ECC 162 are contained, FIG. 41D a case in which the header 160, the count 192, the function range designation information 194 and the ECC 162 are contained, and FIG. 41E a case in which the header 160, ID information 196 unique to the device such as the serial number, the function range designation information 194 and the ECC 162 are contained. The ID information 196 shown in FIG. 41E may be any data by which the device can be recognized, such as the serial numbers of both the remote controllers 12, 70, 88 and the camera proper 14, the serial number or the date or place of manufacture, the model name, the random character string, etc.

As described above, according to the sixth embodiment of the invention, the image acquisition operation can be performed at any time by any person for an improved operability on the one hand, and the security of the other functions such as reproduction and copying is maintained on the other hand.

Also, by containing the function range designation information 194 in the commanding device information, or especially, in the authentication mode switching command, the user can arbitrarily designate the range of the available functions.

Also, since the authentication information contains the ID information unique to the camera proper 14, no malfunction occurs even in the case where there are a plurality of cameras proper 14 of the same configuration.

Incidentally, each commanding device information for the image acquisition device contains the authentication information described above, and therefore, can be positively identified and executed.

[Seventh Embodiment]

Next, a seventh embodiment of the invention will be explained.

According to this embodiment, the temporal element for transmission of the commanding device information is switched.

As explained with reference to FIG. 14, the 1-bit data waveform is such that the binary 0 is formed of "1" and "0" of one unit time T, and the binary 1 of "1" of one unit time T and "0" of three unit time (3T).

Figure 42:
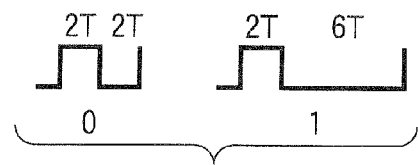
FIG. 42 is a diagram showing the 1-bit data waveform at the time of transmitting the commanding device Information according to a seventh embodiment of the invention.

According to this embodiment, at the time of transmitting the commanding device information, as shown in FIG. 42, for example, the unit time is set to 2T, and the binary 0 is formed of "1" and "0" each of 2T, and the binary 1 formed of "1" of 2T and "0" of 6T. Of course, 2T may be replaced with 3T or 6T with 9T in FIG. 42, or otherwise, the change rate is arbitrarily determined as compared with the case of FIG. 14.

The portion with the temporal elements changed in this way is assigned to the especially important information portion such as the authentication information of the remote control data format (the fixed remote controller identification information 164, etc.), the count value 192 or the designation of the function range designation information 194, while the normal data portion 156 is transmitted in the standard pattern of T and 3T shown in FIG. 14.

As described above, according to the seventh embodiment of the invention, the pattern of the transmission data on time axis, i.e., the pulse width is changed in accordance with the intended data application. In this way, the identification of the data type not by the data interpretation but by the data pattern becomes possible. As a result, as compared with the case in which all the information are transmitted with a simple data pattern and the meaning is interpreted, the important information can be positively identified. Thus, it becomes more difficult to carry out an illegal means such as to reconstruct the ordinary remote controller without the authentication function by adding the authentication function to it. Thus, the authentication and the camera setting change higher in security are made possible.

This change in temporal element may assume various forms such as a combination of 3T and 5T or a combination of 1.5T and 3.5T other than the combination of 2T and 6T. By preparing a plurality of patterns and using a different one for each remote controller, the arrangement can be made to prevent the remote controller of a third party from operating the same type of camera although the risk of 1/100 still remains for 100 patterns.

[Eighth Embodiment]

Next, an eighth embodiment of the invention will be explained.

This embodiment uses the data pattern not appearing in the data format shown in FIGS. 13 to 16.

In the one-bit data waveform, as explained in FIG. 14, the binary 0 is configured of "1" and "0" of one unit time T, and the binary 1 configured of "1" of one unit time T and "0" of 3 unit time (3T).

Figure 43:
FIG. 43 is a diagram showing a special pattern used as a pattern of a part of the transmission data according to an eighth embodiment of the invention.

In contrast, the special pattern, as shown in FIG. 43, for example, is a pattern not appearing in the normal data, such as "1" and "0" of 1T, "1" and "0" of 2T, "1" and "0" of 3T or "1" and "0" of 4T. The length and combination of each pattern are arbitrary as long as it is other than the combination of the binary "0" of 1T and the binary "1" of 3T constituting the normal data pattern, the combination of "1" of 8T and "0" of 4T used as the leader code 154 and the combination "1" of 1T and "0" of 60T used as the stop code 158.

As described above, according to the eighth embodiment of the invention, a part of the pattern of the transmission data of the remote controllers 12, 70, 88 is formed of a special pattern not appearing in the normal data format. In this way, the data type can be identified not by the data interpretation but by the data pattern. As a result, as compared with the case in which all the information are transmitted in simple data patterns and the meaning thereof is interpreted, the important information such as the authentication information (the fixed remote controller identification information 164, etc.), the count 192 or the designation of the function range designation information 194 can be positively identified. Thus, the illegal means such as reconstructing the ordinary remote controller having no authentication function into a remote controller having the authentication function becomes difficult to carry out, thereby making possible the authentication higher in security. By preparing a multiplicity of special patterns and using a different one for each remote controller, the camera of the same type is prevented from being operated by a third party using his/her remote controller although the risk of 1/100 remains for 100 patterns.

[Ninth Embodiment]

Next, a ninth embodiment of the invention will be explained.

According to this embodiment, the command from the optical remote controllers 12, 70 can be received from many directions.

Specifically, in the radio remote controller 88, the characteristic thereof facilitates the reception of the command radio signal from many directions in spite of some directivity depending on the shape of the antenna 34. In the optical remote controllers 12, 70, on the other hand, the photodetector 20 of the camera proper 14, as shown in FIGS. 1 and 3, though capable of easily receiving the command light from the front direction of the camera proper 14, is low in sensitivity against the command light from the up, down, left and right directions or from the direction of the back of the camera proper 14.

Figure 44A:
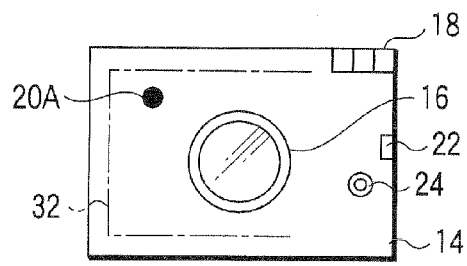
FIG. 44A is a front view of the camera proper for explaining the layout of a photodetector element according to a ninth embodiment of the invention.
Figure 44B:
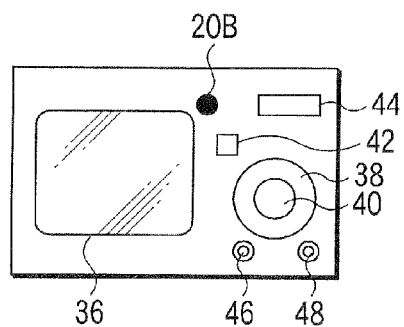
FIG. 44B is a rear view of the camera proper for explaining the layout of a photodetector element according to the ninth embodiment.

According to this embodiment, as shown in FIGS. 44A and 44B, the photodetectors 20A, 20B are arranged at two points as a light-receiving sensor. In FIG. 44A, the photodetector 20A is arranged on the front of the camera proper 14 to receive the command light from the front, while in FIG. 44B, the photodetector 20B is arranged on the back of the camera proper 14 to receive the command light from the back of the camera proper 14.

With this configuration, the command light can be received from a greater number of directions. Incidentally, the reference numerals of other than the photodetectors are identical with the corresponding ones shown in FIGS. 1, 2 and 3.

Figure 45:
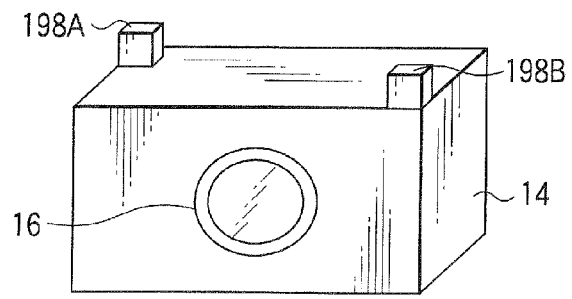
FIG. 45 is a diagram showing another layout of the light-receiving unit according to the ninth embodiment of the invention.

Also, FIG. 45 shows a configuration in which the light-receiving units 198A, 198B are arranged diagonally of each other on the upper surface of the camera proper 14 so that the command light not only from the longitudinal direction but also from the 360°-directions on the horizontal surface including the lateral direction can be easily received. The light-receiving units 198A and 198B are desirably photodetectors as low in directivity as possible.

Figure 46:
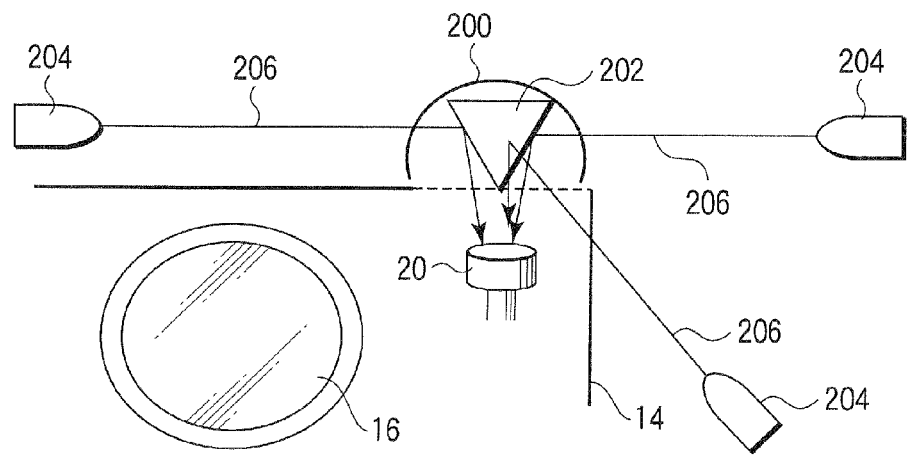
FIG. 46 is a diagram showing an example of the configuration of the light-receiving unit shown in FIG. 45.

For example, FIG. 46 is a diagram showing an example of the configuration of these light-receiving units 198A and 198B. In this configuration, a translucent cover 200 and an inverse conical mirror 202 are arranged on the upper surface of the camera proper 14 to lead the command light 206 of the remote controller 204 from many directions to the photodetector 20. The translucent cover 200 may have the function of an optical filter. Also, in order that the reflection surface of the mirror 202 may have a convergence function, the translucent cover 200 may be either spherical or aspherical.

Figure 47A:
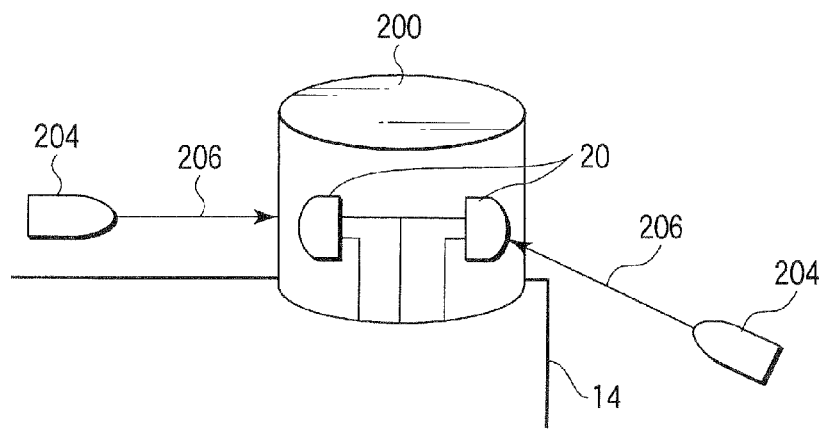
FIG. 47A is a view taken from the side surface of the light-receiving unit for explaining another configuration of the light-receiving unit.
Figure 47B:
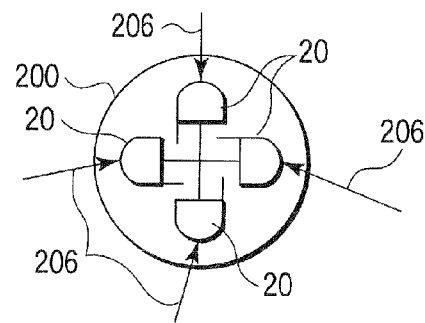
FIG. 47B is a view taken from the upper surface of the light-receiving unit shown in FIG. 47A.

FIGS. 47A and 47B are diagrams showing another configuration of the light-receiving units 198A, 198B. As shown in FIG. 47A, a plurality of photodetectors 20 are arranged in the translucent cover 200 on the upper surface of the camera proper 14 to permit the plurality of the photodetectors 20 to receive the command light 206 of the remote controller 204 from many directions. At least two photodetectors 20 are arranged. The translucent cover 200 may have the function of an optical filter. FIG. 47B is a view from the upper surface of the translucent cover 200, and represents a case in which four photodetectors 20 are arranged.

Figure 48A:
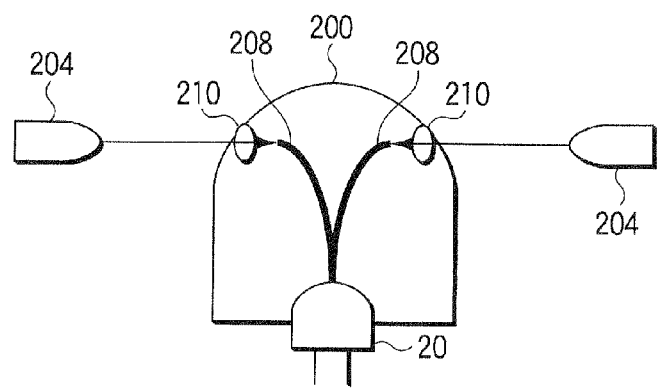
FIG. 48A is a view taken from the side surface of the light-receiving unit for explaining still another configuration of the light-receiving unit.
Figure 48B:
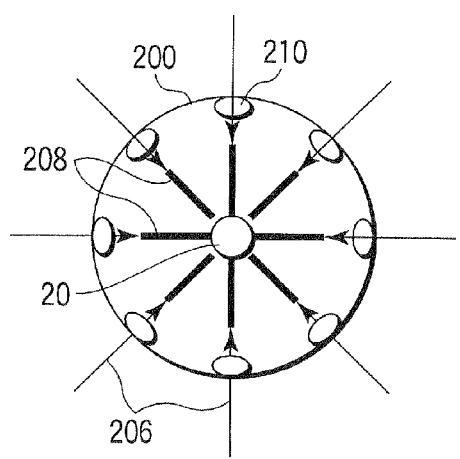
FIG. 48B is a view taken from the upper surface of the light-receiving unit shown in FIG. 48A.

Also, FIGS. 48A and 48B are diagrams showing still another configuration of the light-receiving units 198A, 198B. As shown in FIG. 48A, the command light 206 is led to the photodetector 20 from many directions using a plurality of optical fibers 208. The focusing lens 210 or the optical filter may be done without depending on the balance between the sensitivity of the photodetector 20 and the gain of the amplifier. At least two optical fibers 208 are used and may be arranged in the form of a fiber plate. FIG. 48B is a view taken from the upper surface of the translucent cover 200 and represents a case in which eight optical fibers 208 and eight focusing lenses 210 are arranged.

As described above, according to this ninth embodiment, a configuration is employed in which the command light can be easily received from many directions, thereby remarkably improving the operability in the case where one commanding device is shared by an authentication commanding device and a normal image acquisition/play operation device. Specifically, in the case where the camera proper 14 is set in prohibit mode M1 and thus used with a high security, assume that the picture of the user(s) standing in front of the camera proper 14 is taken by the remote controller command. In the case where the photodetector 20 is arranged on the front surface, the operability is high. In the case where the camera proper 14 is operated while watching the monitor 36 in play mode or at the time of printing, the operation is easy if the photodetector 20 is arranged on the back of the camera proper 14. In the case where the photodetector 20 is arranged only on the front surface, the camera proper 14 is required to be operated by extending the user's hand full to locate the remote controllers 12, 70, 88(204) in front of the camera proper 14 or a mirror is required to be placed in front of the camera proper 14 to reflect the light in such a direction that the light from the remote controller enters the photodetector 20, resulting in a lower operability. Also, in the case where another person or landscape in front of the camera proper 14 is imaged by erecting a tripod or the like and the image acquisition command is issued while viewing the monitor 36, the photodetector 20 is desirably located on the back. Further, in the case where the authentication mode is switched by the remote controller and the confirmation thereof or an alarm message is displayed on the monitor 36, the operability of the photodetector 20 is higher if located on the monitor 36 side. In other than the prohibit mode M1, the operator located even on the back of the camera proper 14 can use the switches and buttons of the camera proper 14 as well as the remote controller. In this case, therefore, the camera proper 14 can be used to a considerable degree even in the case where the photodetector 20 is located only on the front surface of the camera. In prohibit mode M1 with the commanding device having the camera key function, however, only the command from the remote controller is accepted, and therefore, the configuration of this embodiment in which the command light can be accepted from many directions regardless of the position of the commanding device can remarkably improve the operability.

This invention, though explained above with reference to embodiments, is not limited to the embodiments described above, and of course modifiable and applicable variously without departing from the spirit of the invention.

For example, the authentication information may have a dead line, or the authentication information may be changed synchronously between the remote controllers 12, 70, 88 and the camera proper 14 to prevent the illegal use of the authentication information by wiretapping or the like.

The authentication information, though transmitted together with the commanding device information from the remote controller making up a commanding device according to the embodiments described above, may of course be transmitted separately from the commanding device information with equal effect.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image acquisition system comprising:
an image acquisition device having an image acquisition unit; and
a commanding device, which is configured as a separate member from a main body of the image acquisition device, and which is configured to transmit an image acquisition execution command to the main body of the image acquisition device to cause the image acquisition unit to perform an image acquisition operation;
wherein the commanding device includes:
an authentication information transmission unit configured to transmit authentication information to the image acquisition device to cause the image acquisition device to authenticate the commanding device;
wherein the image acquisition device includes:
an authentication information receiving unit configured to receive the authentication information transmitted from the authentication information transmission unit of the commanding device;
an authentication information recognition unit configured to recognize the authentication information received by the authentication information receiving unit; and
a function limiting unit configured to limit a predetermined function of the image acquisition device based on the authentication information recognized by the authentication information recognition unit;
wherein the commanding device further includes:
a commanding device information transmission unit configured to transmit one of an image acquisition command for the image acquisition operation of the image acquisition device including the image acquisition execution command and an authentication mode switching command for limiting the function of the image acquisition device, as a commanding device information;
wherein the image acquisition device includes:
a commanding device information receiving unit configured to receive the commanding device information transmitted from the commanding device information transmission unit of the commanding device;
a command identification unit configured to identify contents of the commanding device information received by the commanding device information receiving unit; and
a mode setting unit configured to set an authentication mode of the image acquisition device in response to the authentication mode switching command identified by the command identification unit;
wherein the function limiting unit of the image acquisition device limits functions of the image acquisition device in accordance with the authentication mode set by the mode setting unit; and
wherein the image acquisition device further includes:
a time measuring unit configured to count time;
wherein the mode setting unit of the image acquisition device sets a prohibit mode as the authentication mode based on the time counted by the time measuring unit; and
wherein the function limiting unit of the image acquisition device prohibits the image acquisition device from execution of the functions thereof by other than the commanding device in a case in which the prohibit mode is set by the mode setting unit.

2. The image acquisition system according to claim 1, wherein the measuring unit of the image acquisition device continues to count the time even after a power supply of the image acquisition device is switched off; and wherein the mode setting unit of the image acquisition device sets the prohibit mode upon counting of a predetermined time by the time measuring unit.

3. The image acquisition system according to claim 2, wherein the mode setting unit of the image acquisition device sets the prohibit mode as the authentication mode one of (i) after a battery is one of consumed up and removed, one of immediately and upon lapse of a preset time and (ii) as a result of monitoring a voltage.

4. The image acquisition system according to claim 1, wherein the mode setting unit of the image acquisition device sets the prohibit mode as the authentication mode one of (i) after a battery is one of consumed up and removed, immediately and upon lapse of a preset time and (ii) as a result of monitoring a voltage.

5. An image acquisition system comprising:
an image acquisition device having an image acquisition unit; and
a commanding device, which is configured as a separate member from a main body of the image acquisition device, and which is configured to transmit an image acquisition execution command to the main body of the image acquisition device to cause the image acquisition unit to perform an image acquisition operation;
wherein the commanding device includes:
an authentication information transmission unit configured to transmit authentication information to the image acquisition device to cause the image acquisition device to authenticate the commanding device;
wherein the image acquisition device includes:
an authentication information receiving unit configured to receive the authentication information transmitted from the authentication information transmission unit of the commanding device;
an authentication information recognition unit configured to recognize the authentication information received by the authentication information receiving unit; and
a function limiting unit configured to limit a predetermined function of the image acquisition device based on the authentication information recognized by the authentication information recognition unit;
wherein the commanding device further includes:
a commanding device information transmission unit configured to transmit one of an image acquisition command for the image acquisition operation of the image acquisition device including the image acquisition execution command and an authentication mode switching command for limiting the function of the image acquisition device, as a commanding device information;
wherein the image acquisition device includes:
a commanding device information receiving unit configured to receive the commanding device information transmitted from the commanding device information transmission unit of the commanding device;
a command identification unit configured to identify contents of the commanding device information received by the commanding device information receiving unit; and
a mode setting unit configured to set an authentication mode of the image acquisition device in response to the authentication mode switching command identified by the command identification unit;
wherein the function limiting unit of the image acquisition device limits functions of the image acquisition device in accordance with the authentication mode set by the mode setting unit; and
wherein the image acquisition device further includes:
a built-in memory;
wherein the function limiting unit of the image acquisition device causes an acquired image to be stored only in the built-in memory in a case in which a prohibit mode prohibiting execution of the function of the image acquisition device by other than the commanding device is set as the authentication mode by the mode setting unit and in a case in which the image acquisition operation is performed by the image acquisition unit based on the image acquisition execution command from the commanding device identified by the command identification unit.

6. The image acquisition system according to claim 5, wherein the function limiting unit of the image acquisition device limits any of operations of reading, displaying, copying, transferring, and printing of the image stored in the built-in memory so as to be performed only in accordance with the image acquisition command from the commanding device authenticated by the authentication information recognized by the authentication information recognition unit.

7. The image acquisition system according to claim 6, wherein the image acquisition device further includes a removable memory; and wherein the image stored in the built-in memory is encrypted and stored when said image is one of copied and transferred to the removable memory.

8. The image acquisition system according to claim 7, wherein the commanding device further includes a selecting unit configured to select whether the image acquired by the image acquisition unit is recorded in the built-in memory or in the removable memory.

9. The image acquisition system according to claim 5, wherein the image acquisition device further includes a removable memory; and wherein the image stored in the built-in memory is encrypted and stored when said image is one of copied and transferred to the removable memory.

10. The image acquisition system according to claim 9, wherein the commanding device further includes a selecting unit configured to select whether the image acquired by the image acquisition unit is recorded in the built-in memory or in the removable memory.

* * * * *